US012496250B1

(12) United States Patent
Liu et al.

(10) Patent No.: US 12,496,250 B1
(45) Date of Patent: Dec. 16, 2025

(54) SYSTEM, APPARATUS, AND METHOD FOR SEXUAL STIMULATION

(71) Applicant: HYTTO PTE. LTD, Singapore (SG)

(72) Inventors: Dan Liu, Guangzhou (CN); Jilin Qiu, Guangzhou (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 18/799,333

(22) Filed: Aug. 9, 2024

Related U.S. Application Data

(63) Continuation-in-part of application No. 29/946,890, filed on Jun. 12, 2024, now Pat. No. Des. 1,046,185.

(51) Int. Cl.
*A61H 19/00* (2006.01)

(52) U.S. Cl.
CPC ............. *A61H 19/34* (2013.01); *A61H 19/44* (2013.01)

(58) Field of Classification Search
CPC ........ A61H 19/00; A61H 19/34; A61H 19/40; A61H 19/44
See application file for complete search history.

(56) References Cited

U.S. PATENT DOCUMENTS 9,889,064 B1* 2/2018 Olivares ................ A61H 19/40
2011/0098613 A1* 4/2011 Thomas .................... B25F 5/02 601/46
2014/0309565 A1* 10/2014 Allen ..................... A61H 19/44 601/46
2016/0120737 A1* 5/2016 Sedic ..................... A61H 19/44 601/46
2018/0042809 A1* 2/2018 Zipper ................... A61H 19/44
2020/0281808 A1 9/2020 Kirsten
2021/0393475 A1 12/2021 He
2023/0355463 A1* 11/2023 Cirillo-Schmidt ........................... A61H 23/0263

FOREIGN PATENT DOCUMENTS

CN 109549832 4/2019

* cited by examiner

*Primary Examiner* — Samuel G Gilbert
(74) *Attorney, Agent, or Firm* — Keefe IP Law, PLLC

(57) ABSTRACT

A device for sexual stimulation is disclosed. The device has a main body configured to be at least partially inserted into a vagina of a female user, the main body including: a first end portion and a second end portion, a first rod portion extending from the first end portion, and a second rod portion coupled to the first rod portion. The second rod portion extends to the second end portion. The second rod portion has a first curved surface and a second curved surface facing away from the first curved surface. The device also has a first stimulation portion disposed at the first curved surface and adjacent to the second end portion, wherein at least a portion of the first stimulation portion is a stimulation point, and an actuator assembly.

20 Claims, 15 Drawing Sheets

SYSTEM, APPARATUS, AND METHOD FOR SEXUAL STIMULATION

CROSS-REFERENCE TO RELATED APPLICATIONS

This application claims priority to design patent application Ser. No. 29/946,890 filed Jun. 12, 2024, the entire disclosure of which is incorporated herein by reference.

FIELD OF THE INVENTION

The present disclosure generally relates to a system, apparatus, and method for sexual stimulation, and more particularly to a system, apparatus, and method for providing a sexual stimulation device.

BACKGROUND OF THE INVENTION

Adult devices such as adult toys can be used to provide sexual stimulation to a user. For example, some adult toys provide sexual stimulation of the female vagina and/or the G-spot located within the vagina.

Although adult toys exist for the stimulation of female genitalia, such existing adult toys are typically not configured to apply effective stimulation to both the clitoris and G-spot. For example, existing adult toys typically do not simultaneously apply effective stimulation to the clitoris and G-spot. Also for example, existing adult toys are typically not configured to continuously achieve effective contact with the upper wall of the vagina when the adult toy is inserted into the vagina. Further for example, existing adult toys are typically not configured to apply pressure in suitable directions relative to the clitoris and the G-spot to provide effective stimulation.

Accordingly, a need in the art exists for an efficient technique and apparatus for providing effective sexual stimulation of female genitalia.

The exemplary disclosed system and method are directed to overcoming one or more of the shortcomings set forth above and/or other deficiencies in existing technology.

SUMMARY OF THE INVENTION

In one exemplary aspect, the present disclosure is directed to a device for sexual stimulation. The device includes a main body configured to be at least partially inserted into a vagina of a female user, the main body including: a first end portion and a second end portion, a first rod portion extending from the first end portion, and a second rod portion coupled to the first rod portion. The second rod portion extends to the second end portion. The second rod portion has a first curved surface and a second curved surface facing away from the first curved surface. The device also includes a first stimulation portion disposed at the first curved surface and adjacent to the second end portion, wherein at least a portion of the first stimulation portion is a stimulation point, and an actuator assembly configured to actuate the stimulation point to stimulate a G-spot of the vagina or a surrounding area thereof along a first vector. A first axis is defined by an axis of the first rod portion. A second axis is defined by a line perpendicular to the first vector and intersecting with the first axis. A first threshold angle is defined by an angle between the first axis and the second axis. The first stimulation portion continuously contacts an upper wall of the vagina based on the first threshold angle.

In another aspect, the present disclosure is directed to a device for sexual stimulation. The device includes a main body configured to be at least partially inserted into a vagina of a female user, the main body including: a first end portion, a second end portion, a first curved surface, and a second curved surface facing away from the first curved surface. Both the first curved surface and the second curved surface extend from the first end portion to the second end portion. The device also includes a first stimulation portion disposed at the first curved surface and adjacent to the second end portion, wherein at least a portion of the first stimulation portion is a stimulation point, an actuator assembly configured to actuate the stimulation point to stimulate a G-spot of the vagina or a surrounding area thereof along a first vector, and an arm including: an elastic connecting portion, and a second stimulation portion configured to connect to the main body via the elastic connecting portion, wherein the elastic connecting portion deforms elastically as the main body is inserted into the vagina of the female user, causing the second stimulation portion to exert pressure along a second vector on a clitoris or surrounding area thereof of the female user, and wherein the second vector crosses or overlaps with the first vector.

DETAILED DESCRIPTION AND INDUSTRIAL APPLICABILITY

Figure 1:
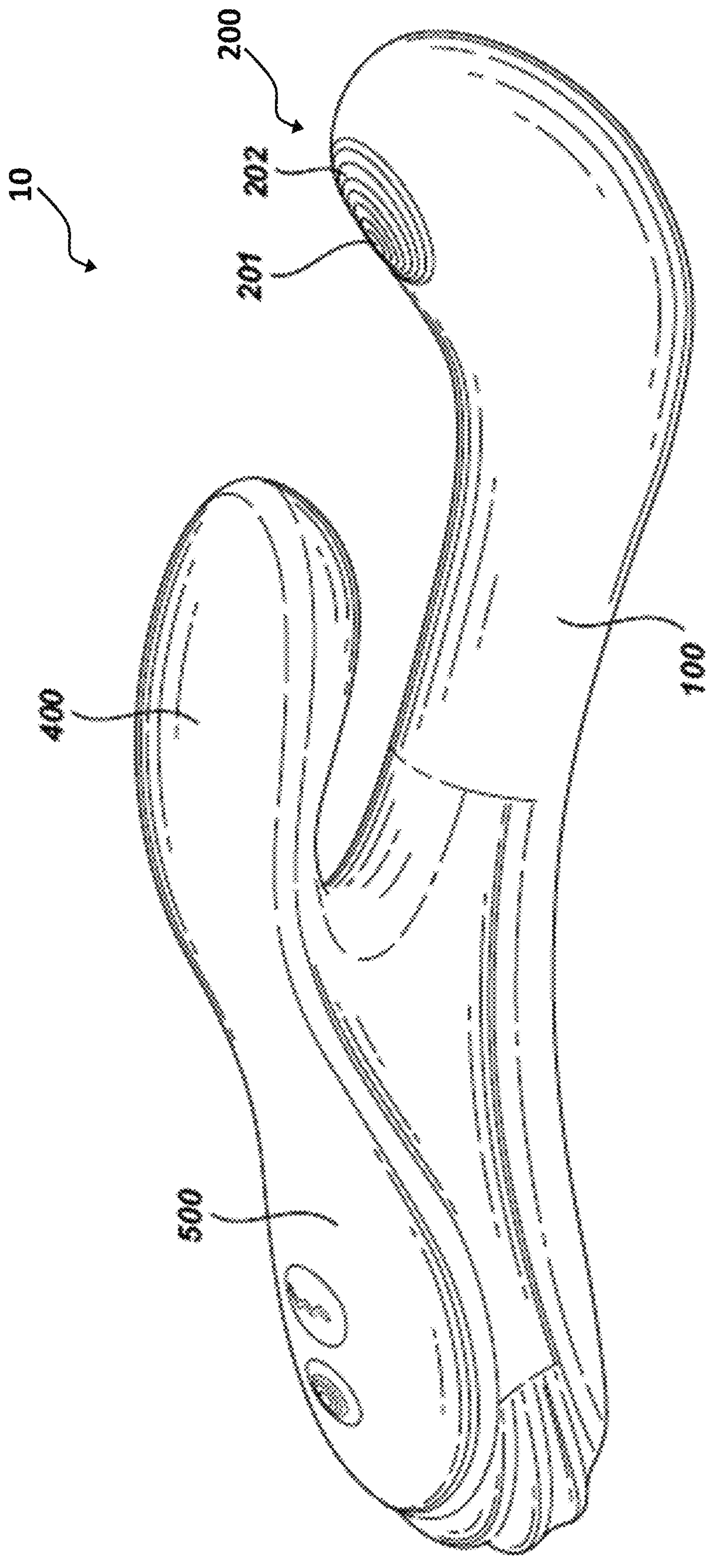
FIG. 1 is a perspective illustration of an exemplary system of the present invention.
Figure 2:
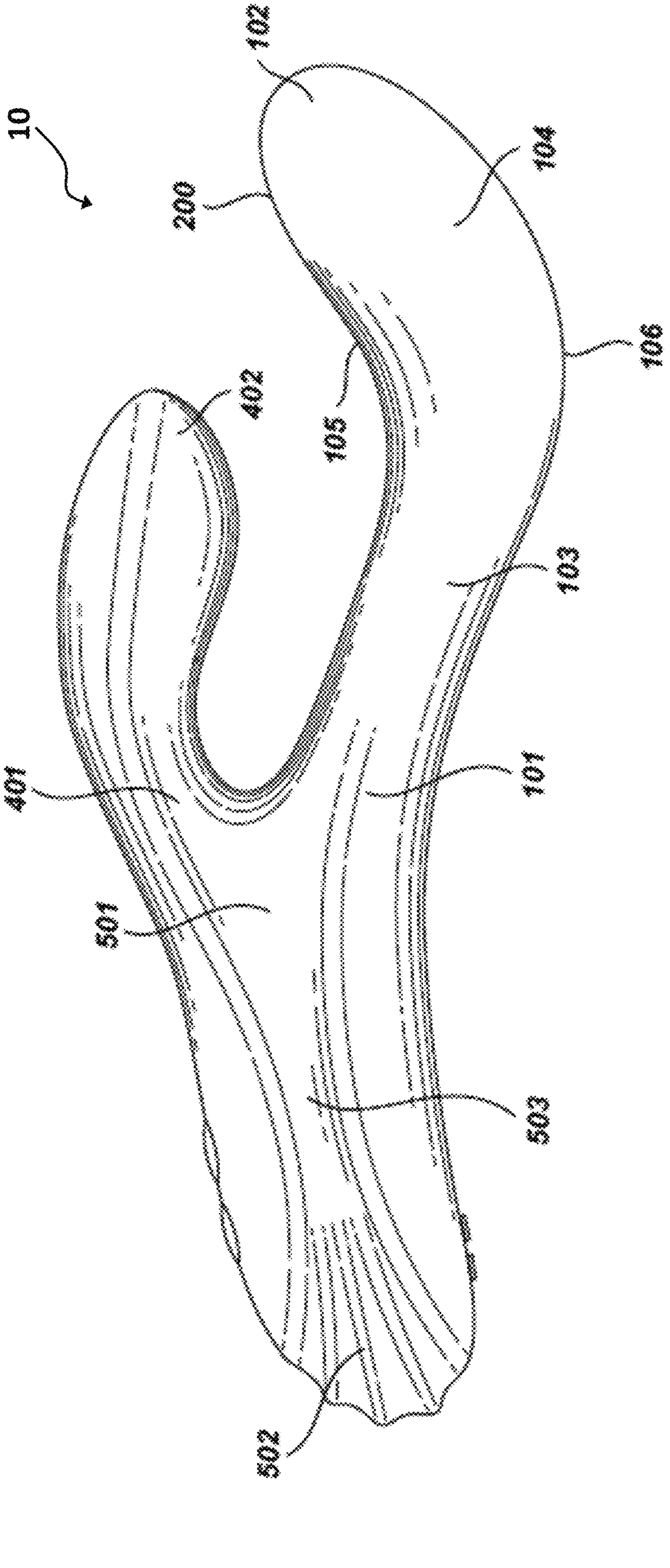
FIG. 2 is another perspective illustration of the exemplary system of FIG. 1.

FIGS. 1 and 2 illustrate an apparatus 10. Apparatus 10 may be an accessory used for erotic stimulation (e.g., a sex aid or adult toy or "sex toy"). Apparatus 10 may be a sexual stimulation device that may be used by a female user. In at least some exemplary embodiments, apparatus 10 may be a massaging apparatus and/or a suctioning apparatus for human genitalia (e.g., a vibrator).

Figure 5:
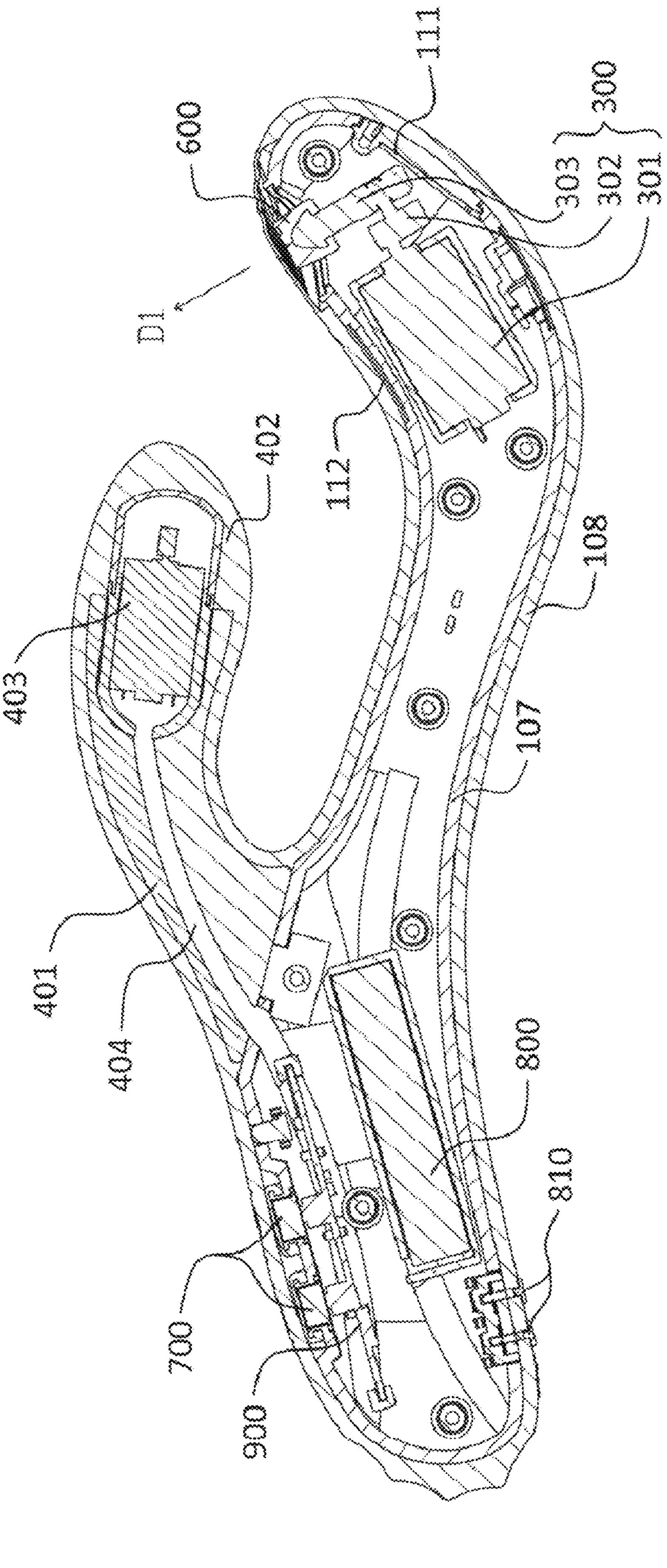
FIG. 5 is a sectional illustration of the exemplary system of FIG. 1.

As illustrated in FIGS. 1, 2, and 5, apparatus 10 may include a main body 100, a first stimulation portion 200, and an actuator assembly 300. Main body 100 may be formed by the exemplary disclosed housing described further below. During use of apparatus 10, a portion (e.g., a substantial portion) of main body 100 may be inserted into a vagina of a female user.

As illustrated in FIG. 2, main body 100 may include a first end portion 101, a second end portion 102, a first rod portion that can be a straight rod portion 103, and a second rod portion that can be a curved rod portion 104. Straight rod portion 103 and curved rod portion 104 may be disposed between first end portion 101 and second end portion 102. First end portion 101 may be coupled with (e.g., smoothly coupled such as based on being attached to and/or integrally formed) a portion of the exemplary disclosed handle described below. Straight rod portion 103 may be a substantially straight portion (e.g., a straight portion) that may extend from first end portion 101 to curved rod portion 104. Curved rod portion 104 may be coupled with (e.g., smoothly coupled such as based on being attached to and/or integrally formed) straight rod portion 103. Curved rod portion 104 may end at second end portion 102. Curved rod portion 104 may have a first curved surface 105 and a second curved surface 106. First curved surface 105 may be disposed at a first side of curved rod portion 104 that may be opposite to a second side of curved rod portion 104 at which second curved surface 106 may be disposed. Second curved surface 106 may thereby face away from first curved surface 105. In at least some exemplary embodiments, apparatus 10 may include main body 100 without the exemplary disclosed arm and the exemplary disclosed handle described below.

As illustrated in FIG. 2, first stimulation portion 200 may be disposed between first curved surface 105 and second end portion 102 (e.g., first stimulation portion 200 may be disposed above first curved surface 105 on apparatus 10). First stimulation portion 200 may thereby be disposed adjacent to second end portion 102. First stimulation portion 200 may include a stimulation point 201 and a stimulation area 202. Stimulation point 201 may be located at a central portion (e.g., a center) of stimulation area 202. Stimulation point 201 may provide a pulsation point based on an operation of actuator assembly 300 as further described below. Stimulation area 202 may be an annular portion (e.g., annular area), an elliptical area, a rectangular area, a polygonal area, and/or any other suitable shape for stimulation.

Figure 9:
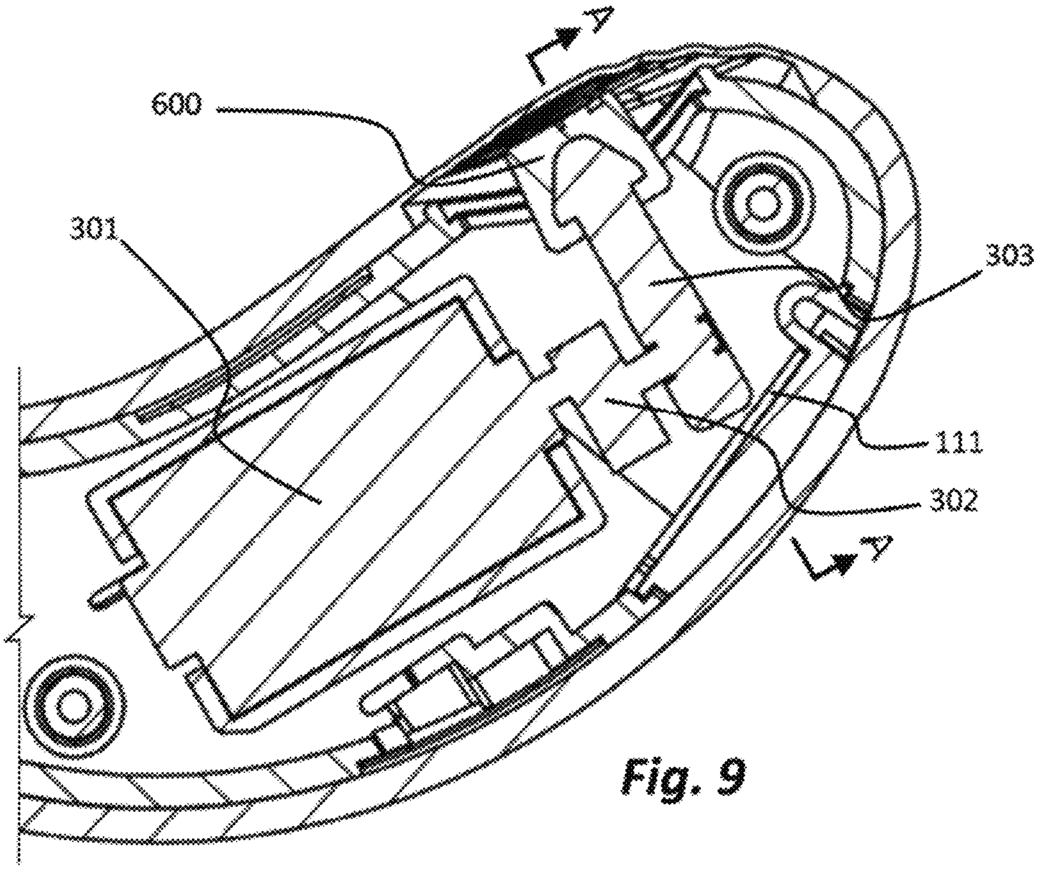
FIG. 9 is another detailed, sectional illustration of the exemplary system of FIG. 1.
Figure 10:
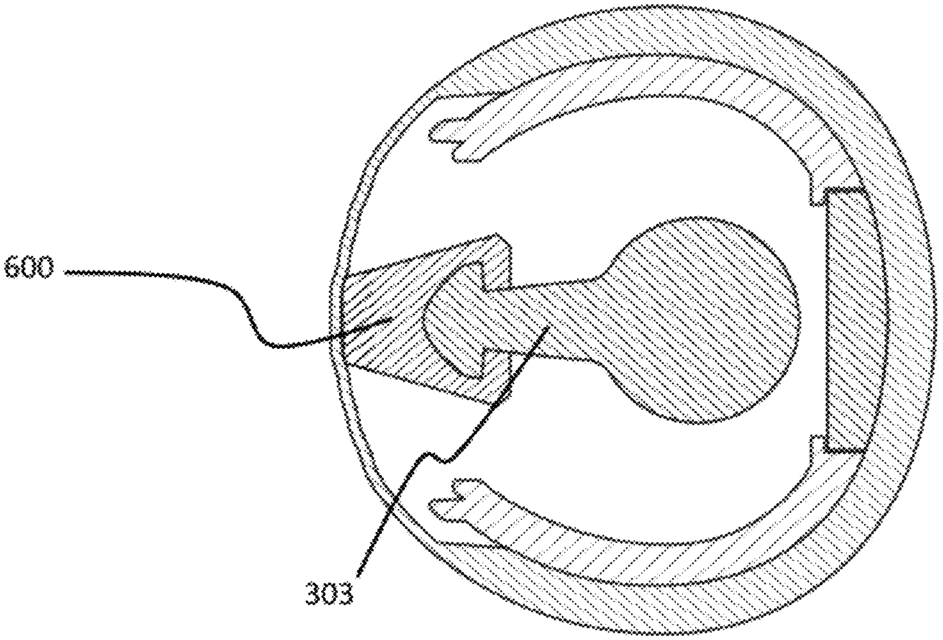
FIG. 10 is a sectional illustration of section A-A illustrated in FIG. 9.

As illustrated in FIGS. 5 and 9, actuator assembly 300 may include a rotating motor 301, a crank linkage mechanism 302, and a pushing rod 303. Actuator assembly 300 may operate based on rotating motor 301 driving pushing rod 303 of crank linkage mechanism 302. In at least some exemplary embodiments, actuator assembly 300 may thereby operate without the use of complex mechanical joints for example to achieve stimulation (e.g., snapping) of the G-spot of female genitalia. For example, the relatively high rotation speed of rotating motor 301 may cause pushing rod 303 to drive stimulation point 201 to reciprocate in a direction of a first vector D1 at high frequency, which may achieve rapid keying of the G-spot during operation (e.g., more rapid keying than would be provided with a mechanical joint stimulation in some embodiments). Pushing rod 303 may be formed from any suitable materials for avoiding a case of stimulation point 201 being blocked and/or stopped by rotating motor 301 caused by relatively strong compression of the vagina by the pelvic floor muscles during operation. For example, pushing rod 303 may be a flexible rod with suitable elasticity. Pushing rod 303 may be formed from any suitable materials such as elastomeric material, natural or synthetic rubber material, and/or any other suitable flexible material.

In at least some exemplary embodiments, actuator assembly 300 may be any other suitable motor for driving stimulation point 201. For example, actuator assembly 300 may include any suitable electric motor. Actuator assembly 300 may include a server motor, a stepper motor, a brushless motor, and/or any other suitable type of motor. Actuator assembly 300 may include any suitable vibration motor or haptic motor such as, for example, a mini vibrator motor. Actuator assembly 300 may include a low voltage motor. Actuator assembly 300 may include a pager motor or a coin vibration motor. Actuator assembly 300 may include a linear resonant actuator or an eccentric rotating mass vibration motor. Actuator assembly 300 may include a reversible electric motor (e.g., a reversible electric motor) and/or a unidirectional motor (e.g., a one-way motor).

Figure 3:
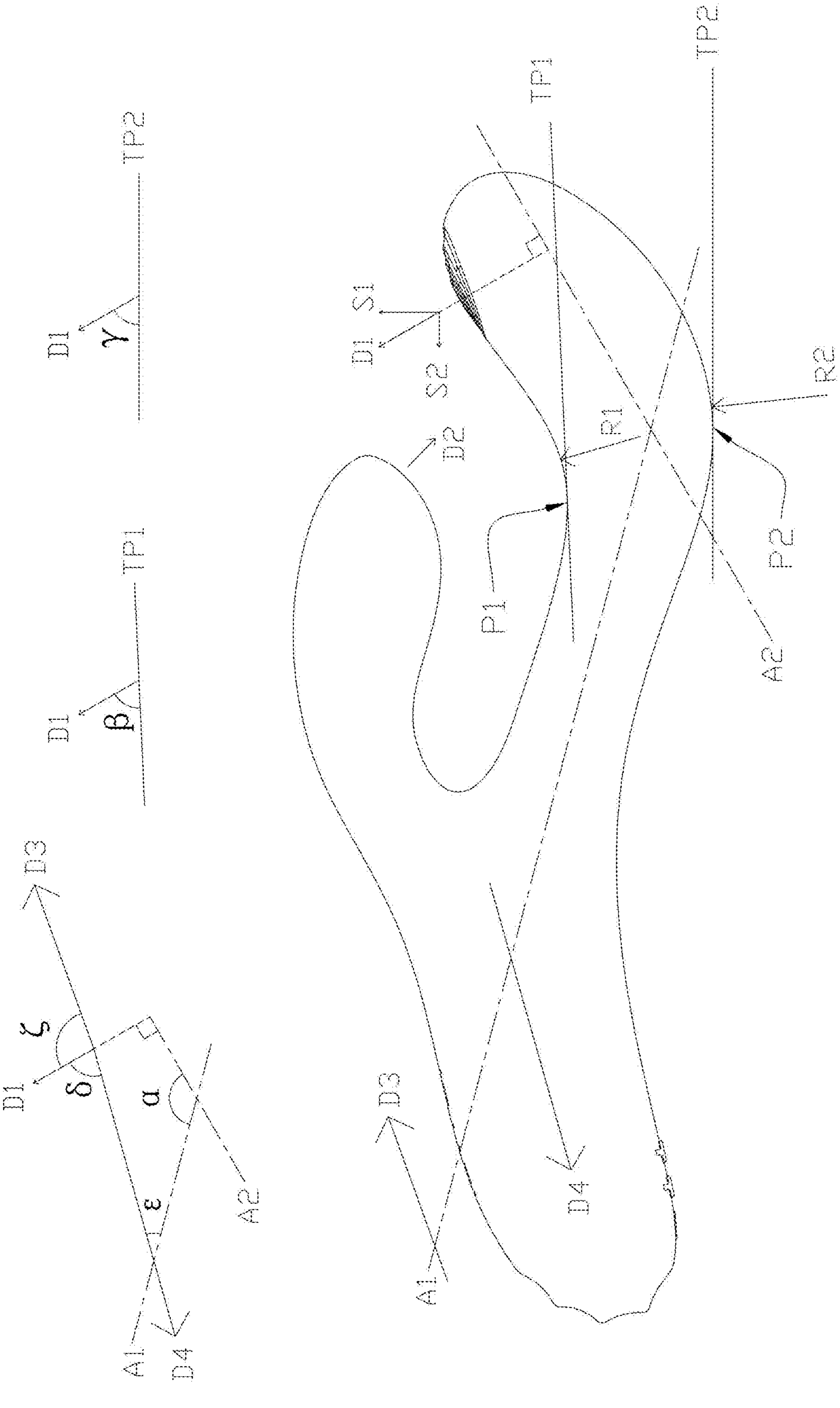
FIG. 3 is a schematic illustration of the exemplary system of FIG. 1.

As illustrated in FIGS. 3 and 5, first vector D1 may be defined based on a direction in which actuator assembly 300 may drive stimulation point 201 (e.g., the pulsation point) to move outwardly towards an exterior of apparatus 10 (e.g., towards first curved surface 105). For example, an axis of straight rod portion 103 may be defined as a first axis A1, and a line perpendicular to first vector D1 may be defined a second axis A2, which can be intersected with first axis D1. An angle between second axis A2 and first axis A1 may be defined as a first threshold angle $\alpha$, which can be an obtuse angle. First threshold angle $\alpha$ may facilitate first stimulation portion 200 achieving substantially continuous contact (e.g., continuously contacts so as to effectively achieve substantially continuous contact) with the upper wall of the vagina during operation of apparatus 10 when main body 100 is inserted into the vagina of a user. For example, if first vector D1 is positioned outside of the exemplary disclosed values provided below of first threshold angle $\alpha$ (e.g., smaller or greater than first threshold angle $\alpha$), second end portion 102 may not make suitable contact with the upper wall of the vagina, thereby preventing first stimulation portion 200 from reaching the G-spot. First threshold angle $\alpha$ may be between about $2\pi/3$ radians and about $5\pi/6$ radians. In at least some exemplary embodiments, an angle between first vector D1 and first axis A1 can be an acute angle, which can be between $\pi/6$ and $\pi/3$.

After main body 100 has been inserted into the vagina of a female user during use of apparatus 10, actuator assembly 300 may actuate stimulation point 201 to apply stimulation (e.g., pulsatile stimulation) to the G-spot and/or surrounding areas thereof within the vagina in a direction of first vector D1. During operation of apparatus 10, a position of stimulation point 201 may be raised or recessed relative to stimulation area 202. In at least some exemplary embodiments, the exemplary disclosed pulsatile stimulation (e.g., provided in a direction of first vector D1 and/or an opposite vector of first vector D1) may be a tapping stimulation provided based on stimulation point 201 being raised relative to stimulation area 202. In at least some exemplary embodiments, the exemplary disclosed pulsatile stimulation (e.g., provided in a direction of first vector D1 and/or an opposite vector of first vector D1) may be a sucking stimulation provided based on stimulation point 201 being recessed relative to stimulation area 202.

Figure 11:
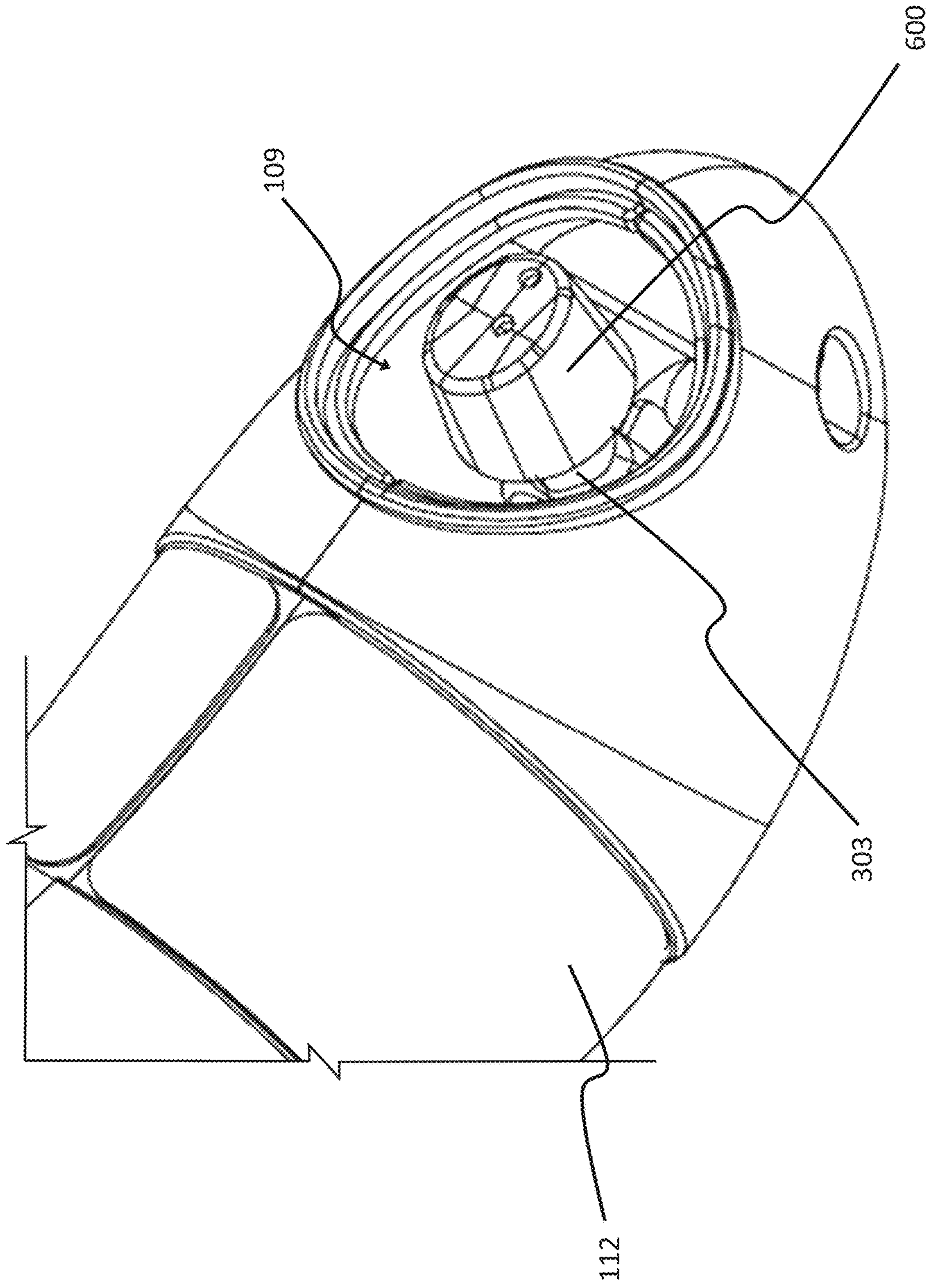
FIG. 11 is a detailed, perspective illustration of a portion of the exemplary system of FIG. 1.

As illustrated in FIG. 5 (e.g., and FIGS. 6, 7, and 11), apparatus 10 may include any suitable heating component for providing further sexual stimulation such as, for example, a heating sheet 112. Heating sheet 112 may be disposed at curved rod portion 104 of main body 100. Heating sheet 112 may surround curved rod portion 104. For example, heating sheet 112 may be disposed at first curved surface 105. Heating sheet 112 may be any suitable flexible and/or thin, flexible heating element. Heating sheet 112 may include one or more silicone rubber heaters, polyimide heaters, screen-printed heaters, and/or any other suitable type of heater.

Returning to FIG. 3, first curved surface 105 may have a suitable radius of curvature for facilitating use of apparatus 10. For example, first curved surface 105 may have a first radius of curvature R1 that may be between about 3.0 centimeters and about 6.0 centimeters. First curved surface 105 may be formed to include a first global extreme point P1 that may be defined as a most convex part of first curved surface 105. First global extreme point P1 may correspond to (e.g., be located in) a first tangent plane TP1. An angle between first vector D1 and first tangent plane TP1 may be defined as a second threshold angle $\beta$. Second threshold angle $\beta$ may facilitate an operation of apparatus 10 that may provide relatively increased sexual stimulation to a user. Second threshold angle $\beta$ may be between about $\pi/4$ radians and about $\pi/3$ radians.

Second curved surface 106 may have a suitable radius of curvature for facilitating use of apparatus 10. For example, second curved surface 106 may have a second radius of curvature R2 that may be between about 3.0 centimeters and about 7.0 centimeters. Second curved surface 106 may be formed to include a second global extreme point P2 that may be defined as a most concave part of second curved surface 106. Second global extreme point P2 may correspond to (e.g., be located in) a second tangent plane TP2. An angle between first vector D1 and second tangent plane TP2 may be defined as a third threshold angle $\gamma$, which can be an acute angle. Third threshold angle $\gamma$ may facilitate an operation of apparatus 10 that may provide relatively increased sexual stimulation to a user. Third threshold angle $\gamma$ may be between about $\pi/4$ radians and about $\pi/2$ radians, and third threshold angle $\gamma$ may be greater than second threshold angle $\beta$.

Returning to FIGS. 1 and 2, in at least some exemplary embodiments, apparatus 10 may include main body 100, first stimulation portion 200, actuator assembly 300, and an arm 400. For example during an operation of apparatus 10 that also includes arm 400, a portion (e.g., a substantial portion) of main body 100 may be inserted into a vagina of a female user. Similar to as described above, upon insertion of main body 100 into the vagina, actuator assembly 300 may actuate stimulation point 201 to apply stimulation (e.g., pulsatile stimulation) to the G-spot and/or the area surrounding the G-spot in a direction of first vector D1.

In at least some exemplary embodiments, both first curved surface 105 and second curved surface 106 may extend from first end portion 101 to second end portion 102 of main body 100 (e.g., when apparatus 10 does or does not include arm 400). The axis (e.g., longitudinal axis) of main body 100 may form an arc. For example, main body 100 may be inserted into the vagina so that first stimulation portion 200 substantially continuously achieves (e.g., maintains) contact with an upper wall of the vagina during operation of apparatus 10.

As illustrated in FIGS. 2 and 5, arm 400 may include a connecting portion 401 and a second stimulation portion 402. Connecting portion 401 may include material disposed in the exemplary disclosed housing described below. The material of connecting portion 401 may be an elastic and/or flexible material. The material of connecting portion 401 may include any suitable materials such as elastomeric material, natural or synthetic rubber material, and/or any other suitable flexible material. One end of connecting portion 401 may be connected to first end portion 101 of main body 100, and another end of connecting portion 401 may be connected to second stimulation portion 402. Connecting portion 401 may be smoothly coupled with (e.g., based on being attached to and/or integrally formed) first end portion 101 and second stimulation portion 402. Connecting portion 401 may be shell-less (e.g., not including or being attached to a shell such as the exemplary disclosed housing).

As illustrated in FIG. 5, arm 400 may include a vibrating motor 403 that may be disposed in (e.g., within) second stimulation portion 402. Vibrating motor 403 may be generally similar to one or more of the exemplary embodiments of the exemplary disclosed motor described above.

Connecting portion 401 may elastically deform when main body 100 is inserted into the vagina. For example when stimulation point 201 is applying stimulation (e.g., vibrating stimulation and/or pulsatile stimulation) to the G-spot within the vagina in a direction of first vector D1, elastic deformation of connecting portion 401 may be suitable (e.g., enough) to allow second stimulation portion 402 to apply pressure (e.g., move relative to main body 100) to the clitoris in a direction of a second vector D2 as illustrated in FIG. 3 (e.g., thereby effectively applying suitable vibrating stimulation and/or pulsatile stimulation to the clitoris). As illustrated in FIG. 4B, connecting portion 401 can be in elastic deformation in such a manner that second stimulation portion 402 may generate second vector D2 that may thereby exert pressure on the clitoris of the female (e.g., effectively applying vibratory stimulation to the clitoris). In at least some exemplary embodiments, second vector D2 may be perpendicular to a rotating shaft of the vibration motor 403.

Figure 4A:
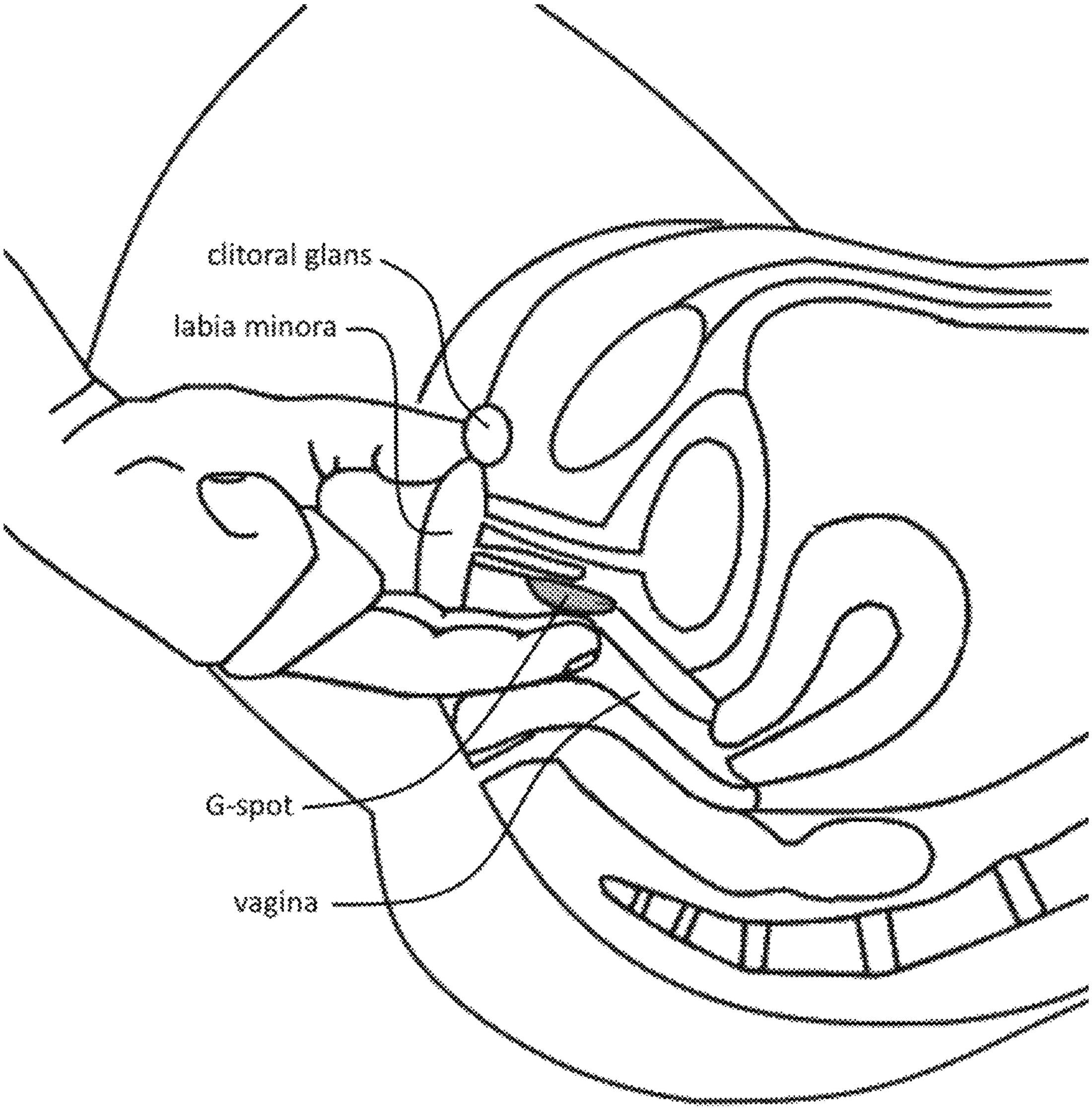
FIG. 4A is a schematic illustration of human anatomy related to a use of the exemplary disclosed system.
Figure 4B:
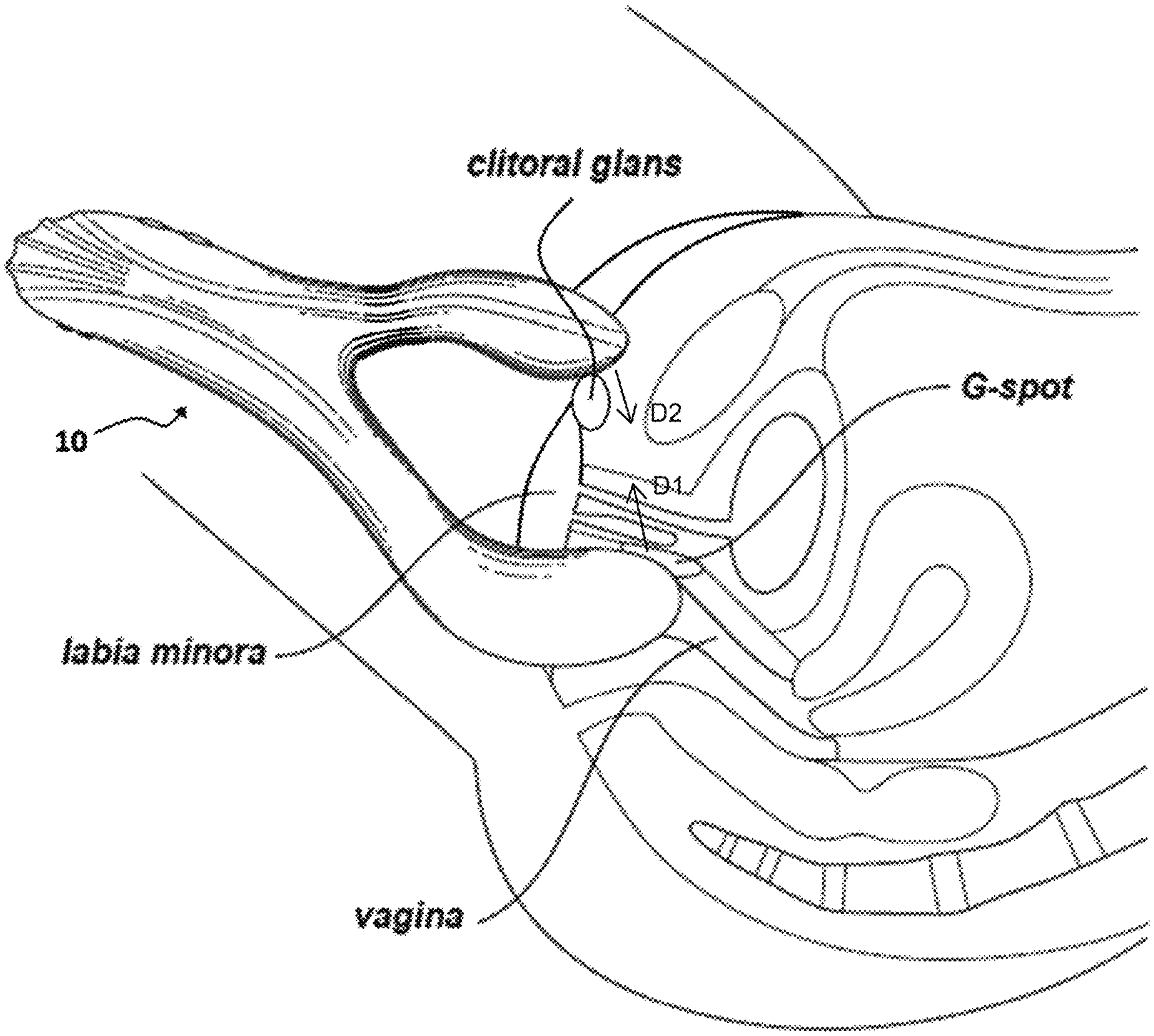
FIG. 4B is another schematic illustration of human anatomy related to the use of the exemplary disclosed system.

As illustrated in FIG. 3, with respect to the anatomical structure of the majority of female sex organs (e.g., as illustrated in FIGS. 4A and 4B), first vector D1 may be inclined relative to main body 100. In view of elasticity of the vaginal wall, first vector D1 applied to the G-spot may be decomposed into a first vector component S1 and a second vector component S2 as illustrated in FIG. 3. For example, first vector component S1 may be perpendicular to the vaginal wall where the G-spot is located, which may provide a pressing stimulation to the G-spot. Second vector component S2 may be substantially parallel to the vaginal wall where the G-spot is located, which may provide a rubbing stimulation to the G-spot.

As illustrated in FIGS. 3, 4A, and 4B, first vector D1 may simulate stimulation of a user's index and/or middle finger applying pressure to the G-spot. Second vector D2 may simulate stimulation of the clitoris (e.g., a user pressing the clitoris). Accordingly, because first vector D1 and second vector D2 may achieve the exemplary disclosed directions as illustrated in FIG. 3, a user's simultaneous application of force to the G-spot and clitoral pressing with the fingers as shown in FIG. 4A may be simulated by apparatus 10 (e.g., as illustrated in FIG. 4B). In at least some exemplary embodiments, a relatively strongest stimulus intensity may be provided when first vector D1 and second vector D2 cross or overlap (e.g., as illustrated in FIG. 3).

Figure 8:
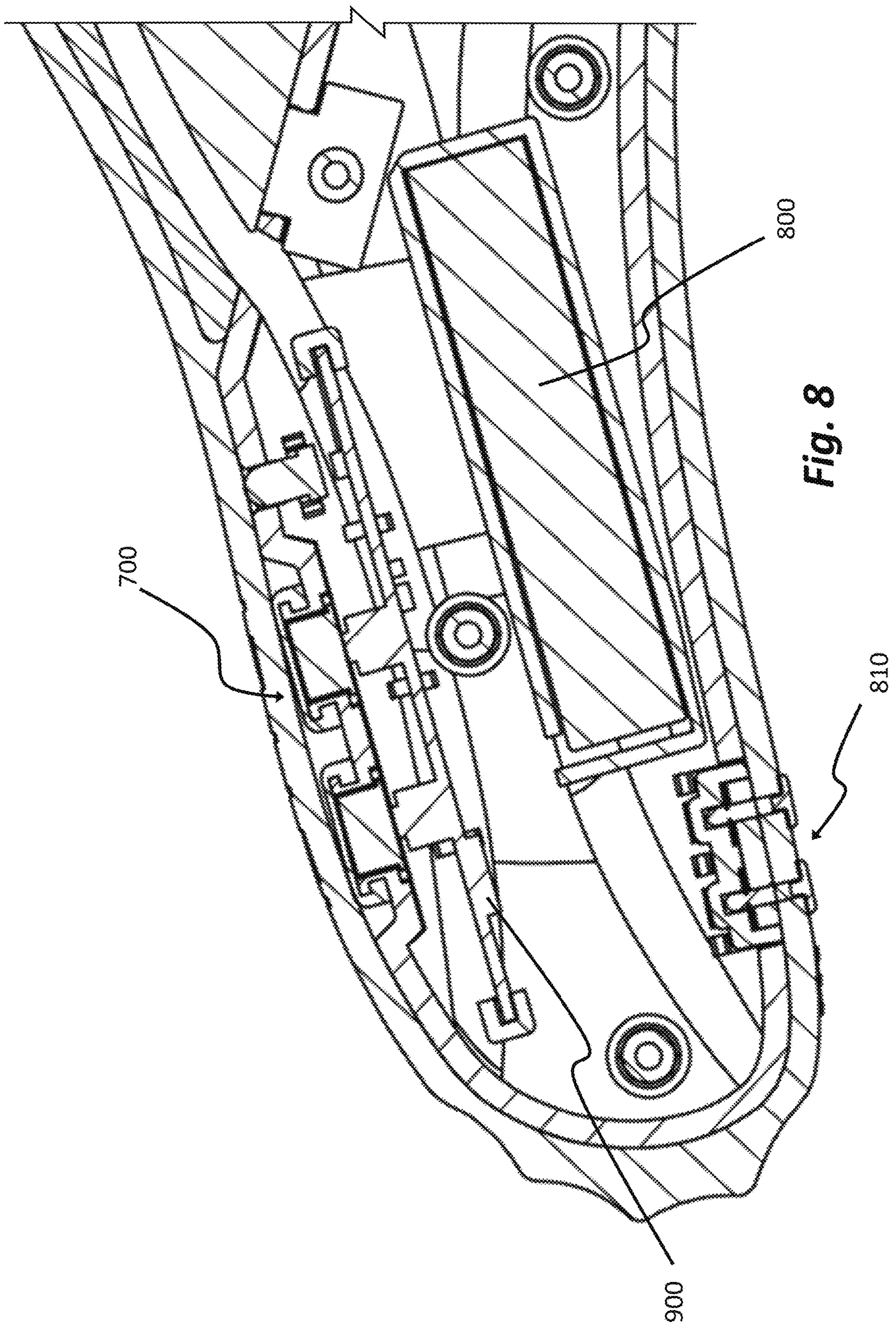
FIG. 8 is a detailed, sectional illustration of the exemplary system of FIG. 1.

As illustrated in FIG. 5, an interior of connecting portion 401 may be free (e.g., not integrally and/or fixedly attached to) the exemplary disclosed housing (e.g., relatively rigid housing), which may enhance a flexibility and/or elasticity of connecting portion 401. For example, an interior cavity of connecting portion 401 may include a passage such as a hollow conduit 404 for receiving (e.g., placing) wires connecting a battery 800 with vibrating motor 403 and/or a control circuit 900. A user may provide input (e.g., control commands) to control circuitry 900 via an input assembly (e.g., including one or more input components 700 such as buttons, switches, dials, and/or any other suitable mechanism for example as illustrated in FIGS. 5 and 8) that may be disposed on the exemplary handhold portion described below.

Battery 800 may be any suitable power source. For example, battery 800 may be a rechargeable lithium-ion battery externally connectable to a power source (e.g., an electrical outlet, external battery, and/or any other suitable power source) via a charging contact 810 (e.g., a magnetic charging contact) for charging for example as illustrated in FIGS. 5 and 8. In at least some exemplary embodiments, battery 800 may be a polymer lithium battery. Battery 800 may also be a nickel-metal hydride battery, an ultracapacitor battery, a lead-acid battery, a nickel cadmium battery, or any other suitable power source.

Control circuit 900 may include any suitable controller components and/or communication components. For example, control circuit 900 may include components similar to as described below regarding communication device 1318 and/or controller 1319.

Returning to FIGS. 1 and 2, in at least some exemplary embodiments, apparatus 10 may include main body 100, first stimulation portion 200, actuator assembly 300, arm 400, and a handle 500. Alternatively for example, apparatus 10 may include main body 100, first stimulation portion 200, actuator assembly 300, and handle 500.

As illustrated in FIG. 2, handle 500 may include a fixed end portion 501, a free end portion 502, and a handhold portion 503. Fixed end portion 501 may be coupled to first end portion 101. Handhold portion 503 may extend from fixed end portion 501 to free end portion 502. The exemplary disclosed portions may be smoothly coupled based on being attached to and/or integrally formed. Handhold portion 503 may be a grip manner that may provide (e.g., may be the portion of apparatus 10 that primarily provides) at least one manner of gripping of apparatus 10 for a user. The user may move apparatus 10 by gripping handhold portion 503 in such a manner as to cause apparatus 10 to move in a direction of third vector D3 or the opposite vector of third vector D3 (or a fourth vector D4 or the opposite vector of vector D4), thereby allowing main body 100 to generate a reciprocating motion. For example when the user's hand grasps handhold portion 503 (e.g., in a suitable and/or comfortable grasping style), the fingers and the palm of the hand of the user may work together to form a cylindrical hollow. This cylindrical hollow may be aligned with a longitudinal axis of handhold portion 503. As illustrated in FIG. 3, an axis of the cylindrical hollow (e.g., a longitudinal axis of handhold portion 503) may be correspond to a third vector D3 or fourth vector D4, which can be substantially opposed to third vector D3. An angle between fourth vector D4 and first vector D1 may be defined as a fourth threshold angle $\delta$. An angle between fourth vector D4 and first axis A1 may be defined as a fifth threshold angle $\varepsilon$. Fourth threshold angle $\delta$ and fifth threshold angle $\varepsilon$ may help facilitate a user using apparatus 10 to touch the G-spot of the user with first stimulating portion 200 when the user is holding apparatus 10 during use. Fourth threshold angle $\delta$ may be between about $\pi/3$ radians and about $\pi/2$ radians. Fifth threshold angle $\varepsilon$ may be between about $\pi/9$ radians and about $\pi/4$ radians. In at least some exemplary embodiments, first threshold angle $\alpha$, fourth threshold $\delta$, and fifth threshold angle $\varepsilon$ may satisfy the equation: $\alpha-\pi/2=\delta-\varepsilon$. In at least some exemplary embodiments, a sixth angle (can be defined by first vector D1 and third vector D3 and may be slightly greater than $\pi/2$ rad. For example, sixth angle $\zeta$ may differ from $\pi/2$ rad by a value that can be between 0 rad and $\pi/18$.

Figure 6:
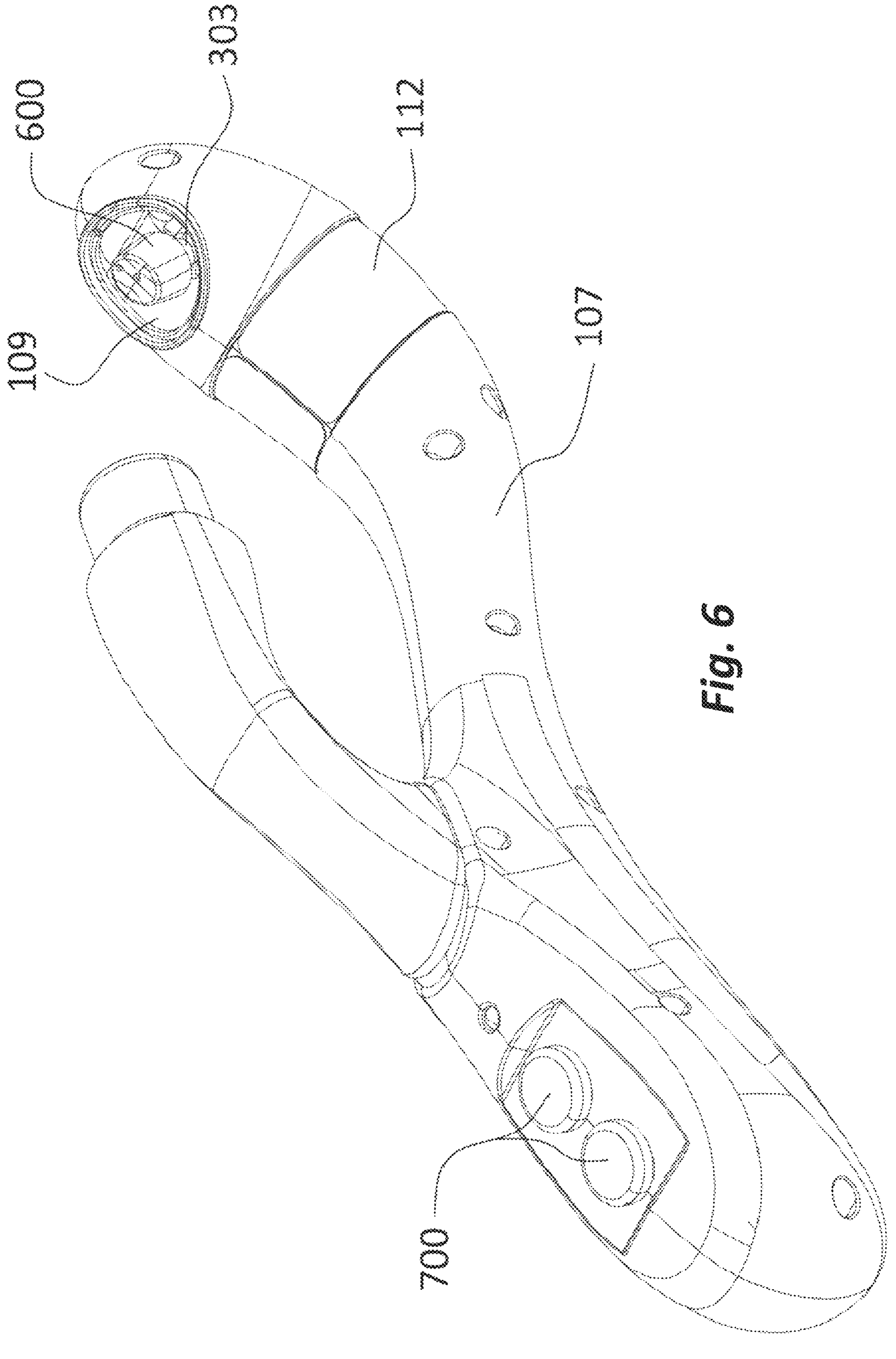
FIG. 6 is another perspective illustration of a portion of the exemplary system of FIG. 1.
Figure 7:
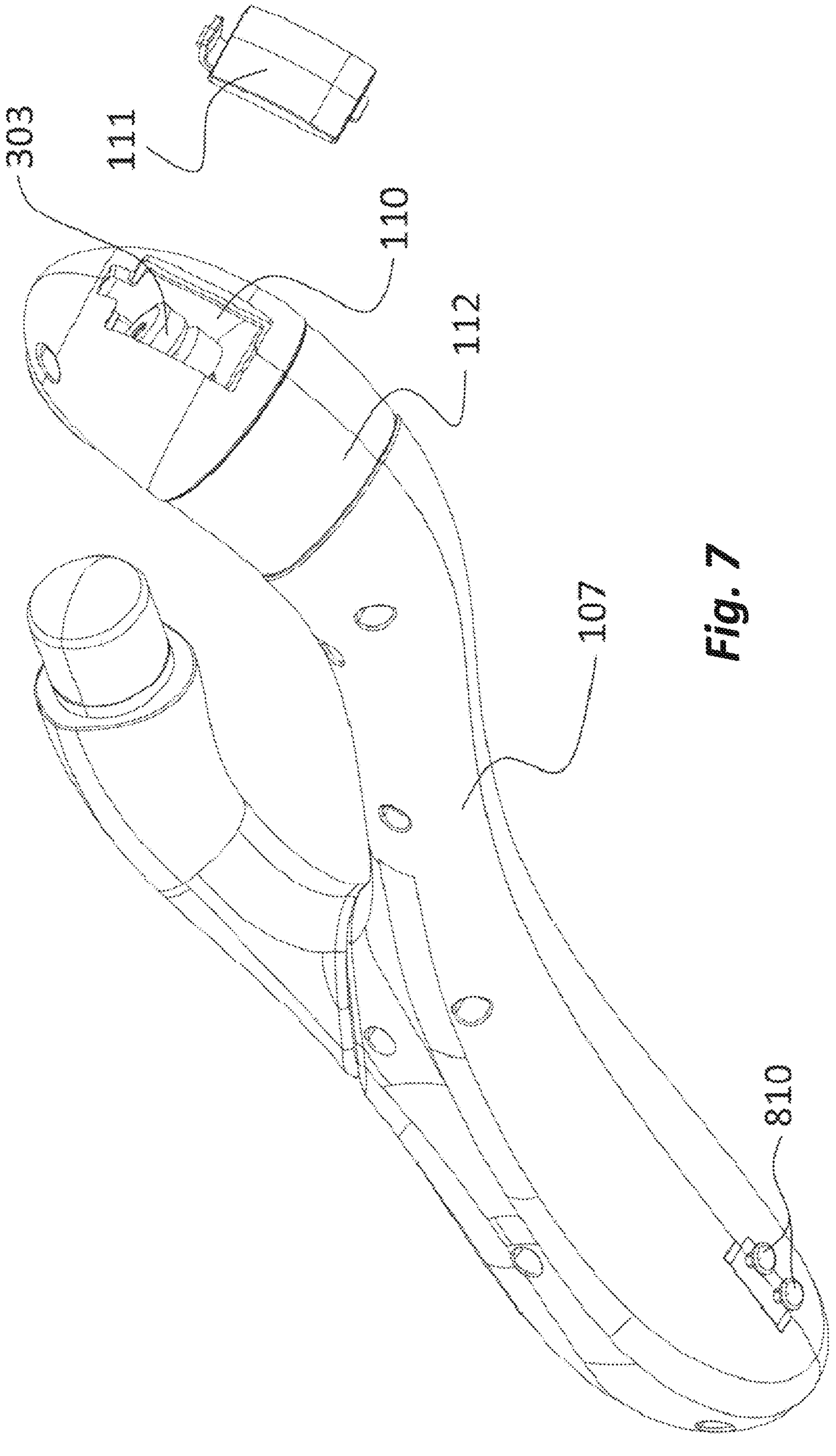
FIG. 7 is another perspective illustration of the portion of the exemplary system of FIG. 6.

As illustrated in FIG. 5, main body 100 may include a housing 107 and a flexible covering member 108 encasing housing 107. Housing 107 may structurally form (e.g., form walls and cavities) first end portion 101, second end portion 102, straight rod portion 103, curved rod portion 104, first curved surface 105, and second curved surface 106 of main body 100. Housing 107 may include one or more exterior structural walls forming a structural exterior of apparatus 10 and one or more interior structural walls forming cavities of the exemplary disclosed portions. The exemplary disclosed exterior walls and interior walls may be integrally formed portions of housing 107 and/or attached via any suitable technique such as mechanical fasteners, adhesive, welding (e.g., plastic welding), and/or any other suitable technique. Housing 107 may be formed from any suitable structural material such as, for example, plastic (e.g., thermoplastic polymeric material). For example, housing 107 may be formed from Acrylonitrile butadiene styrene (ABS) material, polycarbonate material, PPS material, and/or any other suitable structural material. FIGS. 6 and 7 illustrate housing 107 before flexible covering member 108 is provided to apparatus 10 for example as described below. Returning to FIG. 5, flexible covering member 108 may be formed from any suitable flexible material suitable for covering housing 107 for effective and comfortable use by a user. Flexible covering member 108 may be a waterproof and/or water-resistant material. Flexible covering member 108 may be formed from any suitable flexible polymeric material. In at least some exemplary embodiments, flexible covering member 108 may be formed from silicone material. Also for example, flexible covering member 108 may be formed from or include polyurethane and/or MS polymer material.

As illustrated in FIGS. 5, 6, 9, 10, and 11, apparatus 10 may include an embedded connector 600. Embedded connector 600 may be formed from any suitable material such as, for example, material similar to pushing rod 303 and/or housing 107 as described above and/or any other suitable material. First stimulation portion 200 may be disposed at (e.g., disposed on) flexible covering member 108. A tip of pushing rod 303 of actuator assembly 300 may be aligned with stimulation point 201 and embedded in embedded connector 600, with the tip of pushing rod 303 being defined in at least some exemplary embodiments as a power output end portion of actuator assembly 300. In at least some exemplary embodiments, after the tip of pushing rod 303 is embedded in an interior of embedded connector 600, embedded connector 600 may then be connected to stimulation point 201.

Figure 14:
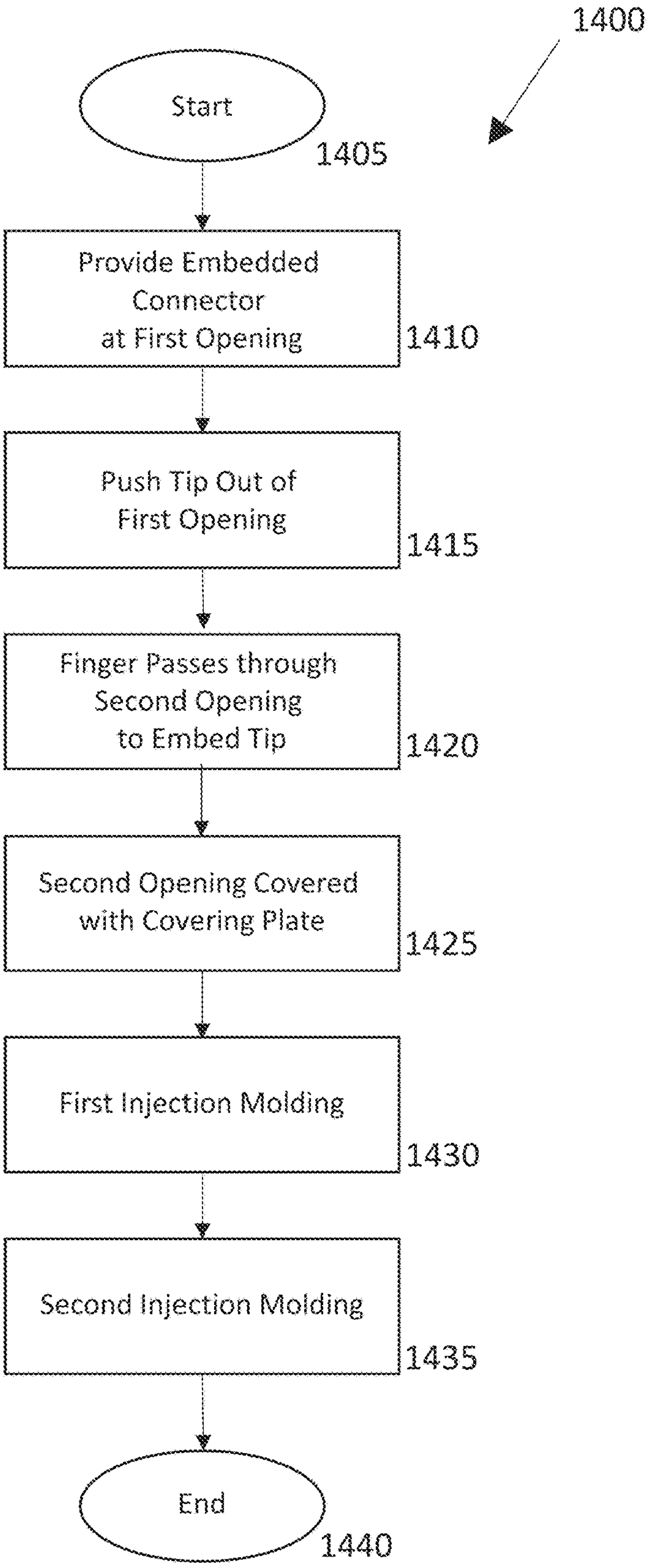
FIG. 14 is a flowchart showing an exemplary manufacturing process of the exemplary disclosed system.

As illustrated in FIGS. 6 and 7, an inclusion of arm 400 and/or handle 500 may make the shape of apparatus 10 more complex in at least some exemplary embodiments. Based on this relative complexity, using a Co-Injection Molding process may be suitable to efficiently achieve an encasement of housing 107 (e.g., a shell) by flexible covering member 108. To facilitate this process, steps may be involved (e.g., before injection molding) to embed the tip of flexible pushing rod 303 in embedded connector 600. FIG. 14 illustrates process 1400 including these steps (e.g., performed in light of FIGS. 6 and 7), which may begin at step 1405.

To facilitate embedding the tip of flexible pushing rod 303 in embedded connector 600, housing 107 may include a first opening 109 and a second opening 110 that may correspond to (e.g., be disposed near) first opening 109 as illustrated in FIGS. 6 and 7. First opening 109 may be disposed at same a side of apparatus 10 as first curved surface 105 (e.g., as illustrated in FIG. 6), and second opening 110 may be disposed at a same side of apparatus 10 as second curved surface 106 (e.g., as illustrated in FIG. 7). First opening 109 may allow passage (e.g., placement) of embedded connector 600 to be disposed and embedded above the tip of pushing rod 303 (e.g., during manufacture, for example at step 1410 of FIG. 14). Second opening 110 may serve to allow a worker to push the tip of flexible pushing rod 303 out of first opening 109 and to stabilize flexible pushing rod 303 by allowing the worker's finger to pass through second opening 110 when assembling that portion of apparatus 10 (e.g., at step 1415 of FIG. 14). Based on the worker's finger passing through second opening 110, the worker may embed (e.g., can easily embed) the tip of flexible pushing rod 303 in embedded connector 600 (e.g., at step 1420 of FIG. 14). After this step is performed, second opening 110 may be covered with a covering plate 111 (e.g., at step 1425 of FIG. 14) for example as illustrated in FIGS. 7 and 9. Covering plate 111 may be formed from similar material as housing 107 and may be attached (e.g., fixedly attached) to housing 107 by any suitable technique such as snap-fit (e.g. in the form of a snap), mechanical fastener, adhesive, and/or any other suitable technique so as to cover second opening 110. Flexible covering member 108 may then be disposed on (e.g., wrapped around) housing 107 by a Co-Injection Molding process. When the tip of pushing rod 303 is embedded in the embedded connector 600, a top surface of embedded connector 600 may be disposed higher (e.g., made higher or above) than first opening 109. At this point, the first injection molding of the Co-Injection Molding process may be performed to provide (e.g., carried out to achieve) a portion such as half (e.g., or any other suitable portion) of flexible covering member 108 being disposed on (e.g., wrapped around a main or a general part of) housing 107 (e.g., at step 1430 of FIG. 14). At this time, first stimulation portion 200 disposed at a top of the portion (e.g., half or other suitable portion) of flexible covering member 108 may be adhered (e.g., bonded) to a top surface of embedded connecting member 600. Subsequently, a second injection molding may be performed to provide a portion (e.g., carried out to wrap the other portion such as a half) of flexible covering member 108 around housing 107 (e.g., at step 1435 of FIG. 14). An assembly of apparatus 10 may thereby be completed (e.g., at step 1440 of FIG. 14).

Figure 12:
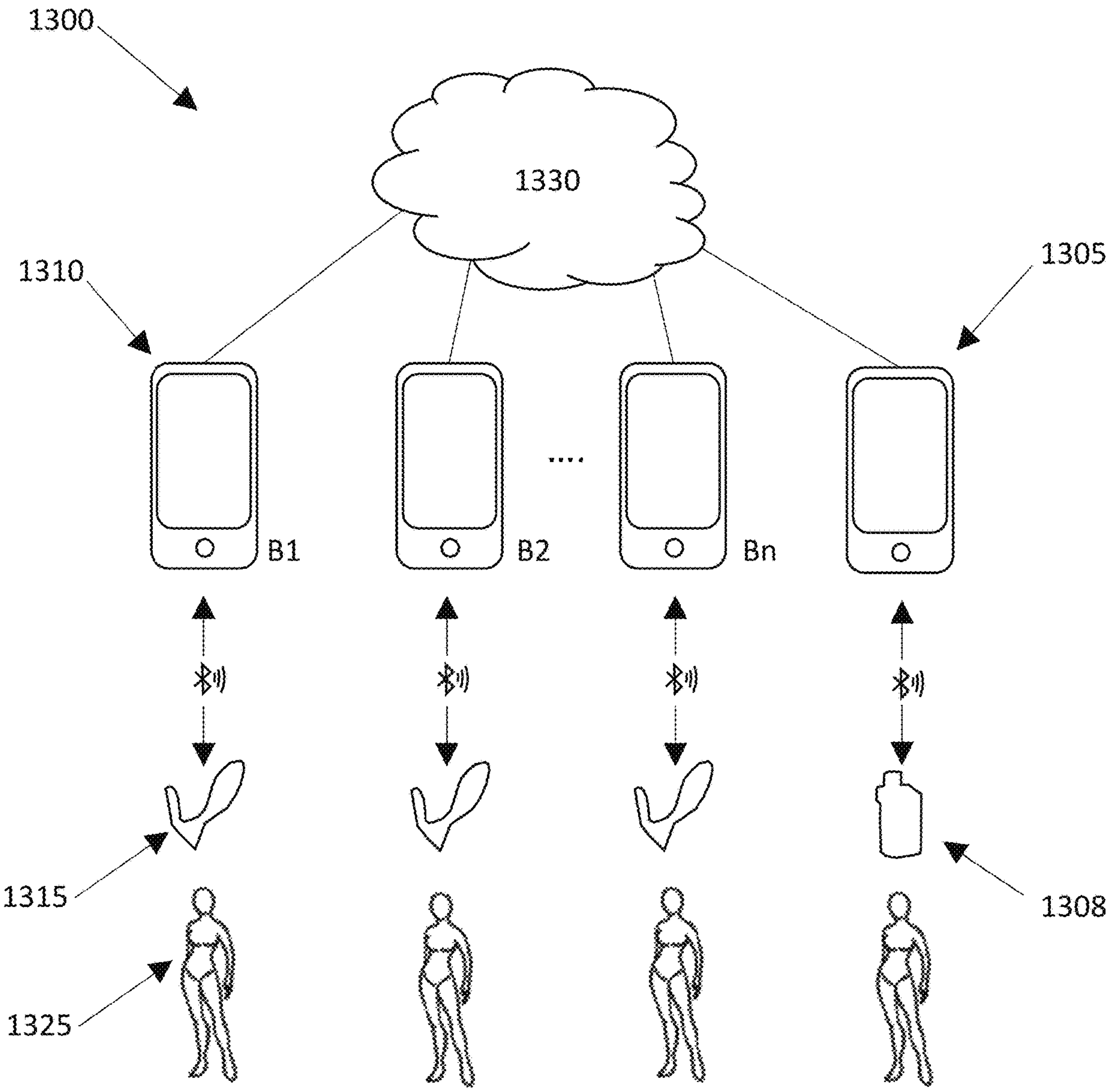
FIG. 12 is a schematic illustration of the exemplary disclosed system.

FIG. 12 illustrates an exemplary system 1300 for controlling one or more female accessories 1315 that may be similar to the exemplary disclosed sexual stimulation device (e.g., apparatus 10) described above and one or more male accessories. For example, apparatus 10 may be included as female accessory 1315 in system 1300. System 1300 may include one or more female user devices 1310, one or more female accessories 1315 (e.g., that may be similar to apparatus 10 described above), one or more male user devices 1305, and/or one or more male accessories 1308 (e.g., male accessories such as male adult toys, for example, rings, strokers, vibrators, plugs, or any other suitable accessory). Female accessories 1315 and male accessories 1308 may be used by one or more users 1325 such as female and/or male users. Data such as image data, audio data, and/or control data may be transferred between male user devices 1305, male accessories 1308, female user devices 1310, and female accessories 1315.

System 300 may include any desired number of female user devices 1310 (e.g., B1, B2, . . . . Bn) and/or similarly include any desired number of male user devices 1305. Female user device 1310 may be any suitable device for interfacing with other components of system 1300 such as a computing device (e.g., user interface). For example, female user device 1310 may be any suitable user interface for receiving input and/or providing output (e.g., image data) to user 1325. Female user device 1310 may include a camera and a microphone. Female user device 1310 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 1300, and/or any other suitable user interface. For example, female user device 1310 may include a touchscreen device of a smartphone or handheld tablet. For example, female user device 1310 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. Any suitable application and/or web browser (e.g., for controlling female accessory 1315 that may be similar to apparatus 10) may be installed on female user device 1310 and utilized by user 1325.

Figure 13:
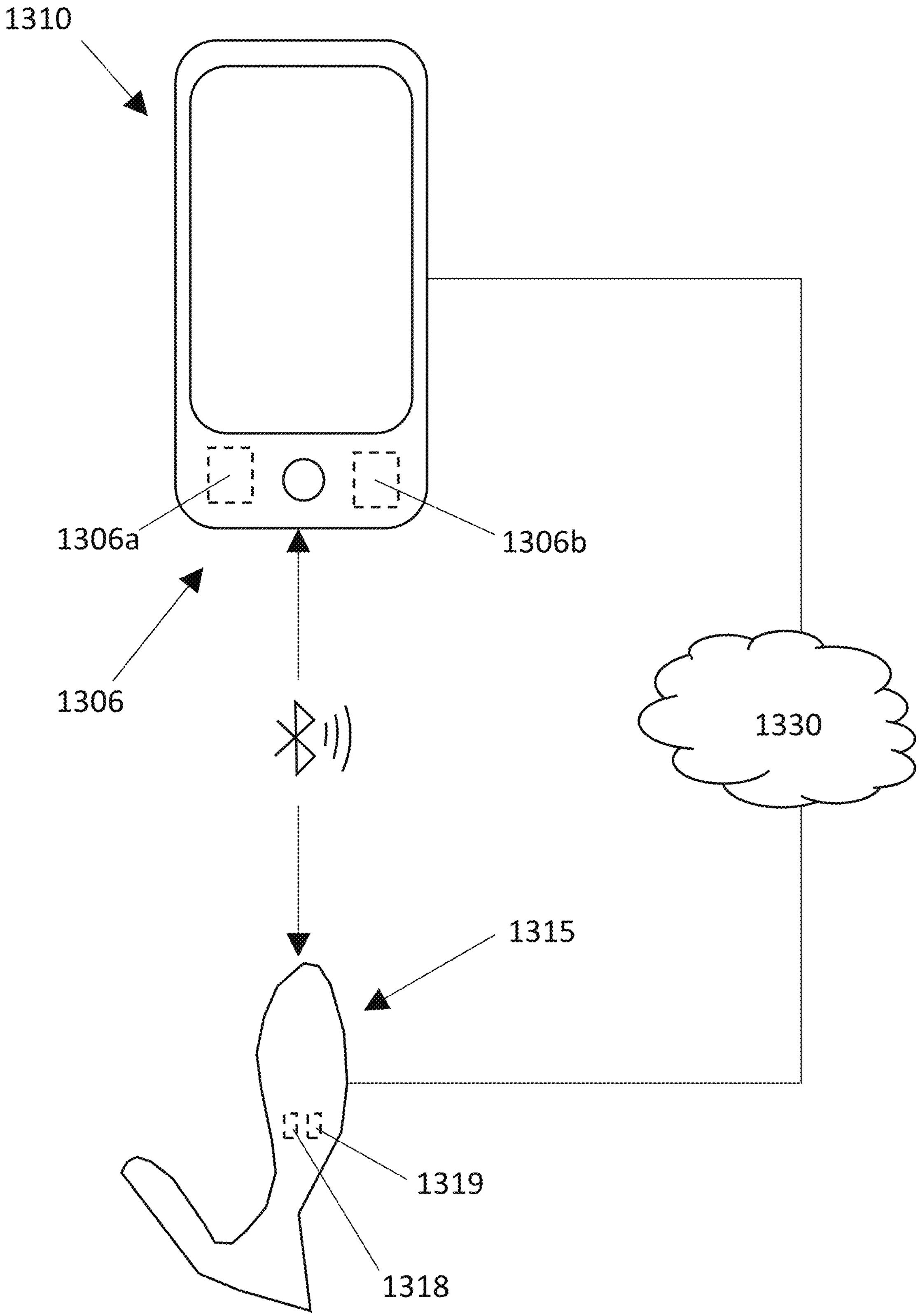
FIG. 13 is another schematic illustration of the exemplary disclosed system.

As illustrated in FIG. 13, female user device 1310 may include a sensor array 1306. Sensor array 1306 may sense data that may be transferred to and/or used in the operation of female accessory 1315 that may be similar to apparatus 10. In at least some exemplary embodiments, sensor array 1306 may include one or more sensors integrated or built into the exemplary disclosed user device such as, for example, a mobile phone, a pad, or a wearable device. Sensor array 1306 may include any suitable sensors for use with system 1300 such as, for example, a location sensor 1306*a* and a movement sensor 1306*b*. Location sensor 1306*a* may include a GPS device, a Galileo device, a GLONASS device, an IRNSS device, a BeiDou device, and/or any other suitable device that may operate with a global navigation system.

Movement sensor 1306*b* may include any suitable components for sensing motion (e.g., motion amplitude), velocity, and/or acceleration. Movement sensor 1306*b* may include an acceleration sensor. Movement sensor 1306*b* may include a gyroscope. For example, movement sensor 1306*b* may include a displacement sensor, a velocity sensor, and/or an accelerometer. For example, movement sensor 1306*b* may include components such as a servo accelerometer, a piezoelectric accelerometer, a potentiometric accelerometer, and/or a strain gauge accelerometer. Movement sensor 1306*b* may include a piezoelectric velocity sensor or any other suitable type of velocity or acceleration sensor.

Returning to FIG. 12, system 1300 may include any desired number of male user devices 1305. Male user device 1305 may be similar to female user device 1310. Any desired number of female user devices 1310 and/or male user devices 1305 may be operated by corresponding users 1325 (e.g., female users, male users, and/or any other users).

Returning to FIG. 13, female accessory 1315 may include controller 1319 that may be any suitable computing device for controlling an operation of motors of female accessory 1315 and a communication device 1318 of female accessory 1315. For example, controller 1319 and/or communication device 1318 may be provided in apparatus 10 as parts of control circuit 900. Controller 1319 may include for example a processor (e.g., micro-processing logic control device) or board components. Controller 1319 may control one or more motors based on input data and/or commands (e.g., control commands) received from female user device 1310 (e.g., and/or male user device 1305) via a network 1330 and/or communication device 1318 (e.g., transferred directly to communication device 1318 by any suitable component of system 1300). Motors of female accessory 1315 may be controlled by controller 1319 to vibrate female accessory 1315 (e.g., apparatus 10) at a desired level or strength, perform a suction operation at a desired level or strength using female accessory 1315 (e.g., using female accessory 1315 as a suction device), and/or cause female accessory 315 to perform any other suitable action or function.

Network 1330 may be any suitable communication network over which data may be transferred between one or more female user devices 1310, one or more female accessories 1315, one or more male user devices 1305, and/or one or more male accessories 1308. Network 1330 may be the internet, a LAN (e.g., via Ethernet LAN), a WAN, a WiFi network, or any other suitable network. The components of system 1300 may also be directly connected (e.g., by wire, cable, USB connection, and/or any other suitable electromechanical connection) to each other and/or connected via network 1330. For example, components of system 1300 may wirelessly transmit data by any suitable technique such as, e.g., wirelessly transmitting data via 4G LTE networks (e.g., or 5G networks) or any other suitable data transmission technique for example via network communication. Female user devices 1310, female accessories 1315, male user devices 1305, and/or male accessories 1308 may include any suitable communication components for communicating with other components of system 1300 using for example the communication techniques described above. For example, female user devices 1310 and male user devices 1305 may include integrally formed communication devices (e.g., smartphone components), and female accessories 315 and male accessories 1308 may each include communication device 1318 that may communicate using any of the exemplary disclosed communication techniques.

In at least some exemplary embodiments, a given female accessory 1315 may communicate with a given female user device 1310 (e.g., a paired female user device 1310) via any suitable short distance communication technique. For example, female accessories 1315 (e.g., via communication device 1318) and female user devices 1310 may communicate via WiFi, Bluetooth, ZigBee, NFC, IrDA, and/or any other suitable short distance technique. Female accessory 1315 may be an adult toy that may be connected with female user device 1310 through short distance wireless communication. An application (e.g., operating using the exemplary disclosed modules) may be installed on female user device 1310, the application and female user device 1310 being configured to send commands to female accessory 1315 to drive (e.g., actuate) female accessory 1315. Male accessory 1308 may communicate with male user device 1305 similarly to the communication of female accessory 1315 and female user device 1310 described above.

System 1300 may include one or modules for performing the exemplary disclosed operations. The one or more modules may include an accessory control module for controlling female accessory 1315 and male accessory 1308. The one or more modules may be stored and operated by any suitable components of system 1300 (e.g., including processor components) such as, for example, network 1330, female user device 1310, female accessory 1315, male user device 1305, male accessory 1308, and/or any other suitable component of system 1300. For example, system 1300 may include one or more modules having computer-executable code stored in non-volatile memory. System 1300 may also include one or more storages (e.g., buffer storages). The exemplary disclosed buffer storage may be implemented in software and/or a fixed memory location in hardware of system 1300. The exemplary disclosed buffer storage (e.g., a data buffer) may store data temporarily during an operation of system 1300.

System 1300 may also include one or more imaging devices that may be any suitable imaging device such as a camera. For example, the exemplary disclosed imaging device may be any suitable video camera such as a digital video camera, a webcam, and/or any other suitable camera for recording visual data (e.g., recording a video or taking pictures) and/or image recognition. The exemplary disclosed imaging device may be a 3D camera, a headset that may be worn by a user, a spatial computing device (e.g., a spatial computer), a three-dimensional video sensor or camera, a camera of the exemplary disclosed user devices described above, a stereoscopic camera (e.g., and/or any other suitable device for stereo photography, stereo videography, and/or stereoscopic vision), and/or any other suitable type of imaging devices.

System 1300 may also include one or more wearable devices that may be any suitable device for allowing a user to control system 1300 based on user actions (e.g., movements and/or gestures). The exemplary disclosed wearable device may be any suitable motion detection device, a smart device (e.g., a smart wristband, smart glove, or one or more smart rings that may be worn by a user) and that may communicate with components of system 1300 via any of the exemplary disclosed communication techniques. The exemplary disclosed wearable device may include any suitable motion and/or position sensors that may communicate with the exemplary disclosed user devices or any other suitable component of system 1300. In at least some exemplary embodiments, the exemplary disclosed wearable device may be detected and/or tracked by the exemplary disclosed imaging device or may operate to sense user actions (e.g., gestures) without an imaging device.

The exemplary disclosed sexual stimulation device described above (e.g., female accessory 1315 that may be similar to apparatus 10 described above regarding FIGS. 1 through 11) may operate together with the above described components of system 1300. For example, the exemplary disclosed sexual stimulation device may operate in conjunction with female user device 1310, male user device 1305, male accessory 1308, the exemplary disclosed modules, the exemplary disclosed imaging device, the exemplary disclosed wearable device, and/or any other suitable components.

The exemplary disclosed system, apparatus, and method may be used in any suitable application for providing sexual stimulation. The exemplary disclosed system, apparatus, and method may be used in any suitable application for providing an adult toy. The exemplary disclosed system, apparatus, and method may be used in any suitable application for providing a female sex toy.

Figure 15:
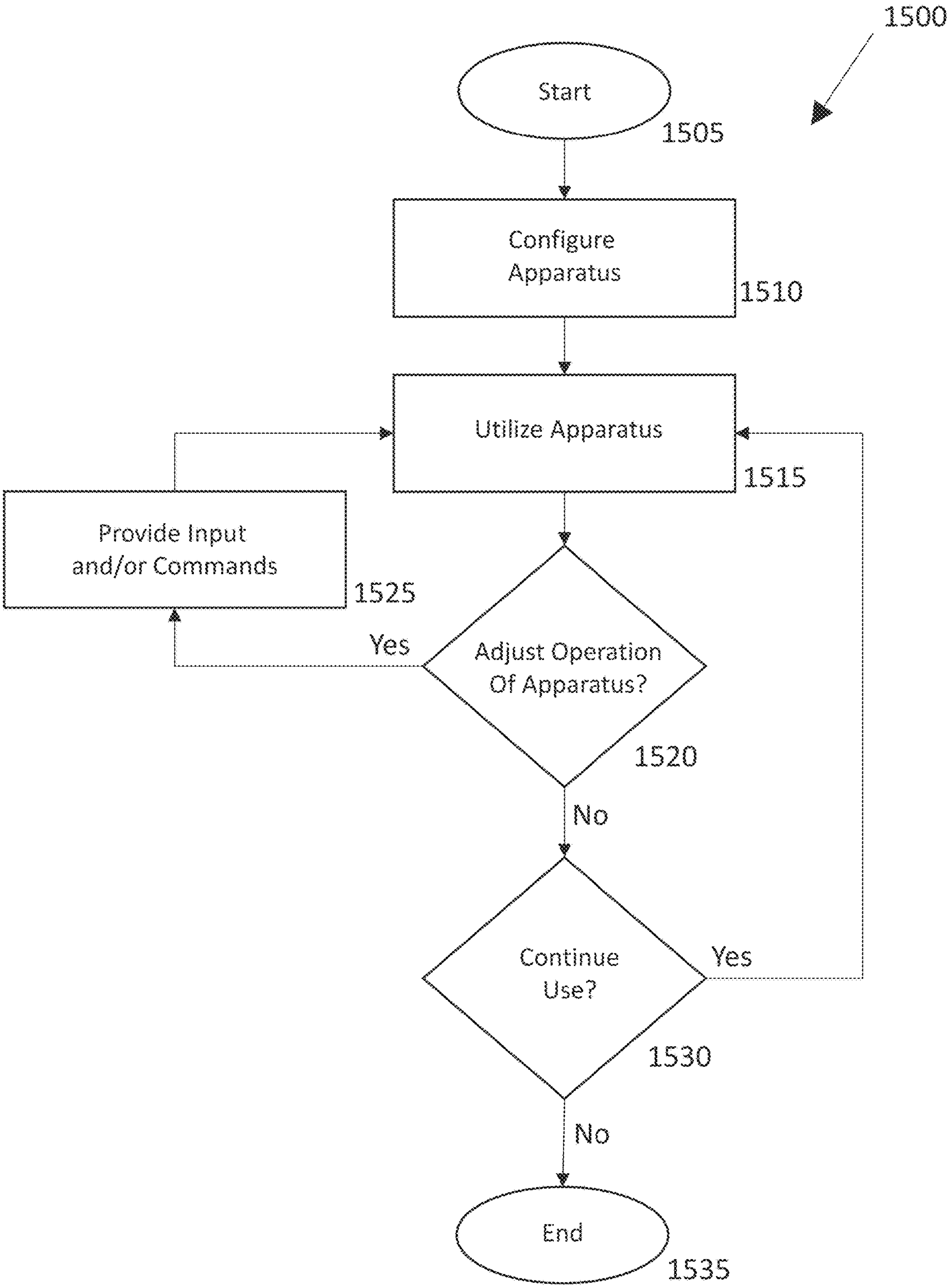
FIG. 15 is a flowchart showing an exemplary process for operation of the present invention.

FIG. 15 illustrates an exemplary process of using the exemplary disclosed system and apparatus. Process 1500 begins at step 1505. At step 1510, apparatus 10 (e.g., and/or apparatus 1315) may be configured (e.g., by a user and/or based on operation of modules and/or predetermined operation of system 1300). For example, apparatus 10 (e.g., and/or apparatus 1315) may be configured to operate in conjunction with other apparatuses 10, female user device 1310, male user device 1305, male accessory 1308, the exemplary disclosed modules, the exemplary disclosed imaging device, the exemplary disclosed wearable device, and/or any other suitable components (e.g., of system 1300).

At step 1515, a user (e.g., user 1325) may utilize apparatus 10 for example for sexual stimulation (e.g., for example as illustrated in FIG. 4B and as described above). At step 1520, it may be determined whether an operation of apparatus 10 is to be adjusted. If the operation is to be adjusted, process 1500 proceeds to step 1525.

At step 1525, operation may be adjusted by the user. For example, the user may adjust operation of apparatus 10 via input provided to apparatus 10 via one or more input components 700 for example as described above. Operation of apparatus 10 may also be adjusted based on the exemplary disclosed modules and/or controllers described above. For example, system 1300 may automatically adjust an operation of apparatus 10 based on predetermined criteria such as a predetermined time period and/or tips or other criteria provided by the user (e.g., and/or other users of system 1300), algorithms of system 1300, and/or any other suitable criteria. Process 1500 may then return to step 1515. As many iterations as desired of steps 1515 through 1525 may be performed.

If the operation is determined to not be adjusted at step 1520, process 1500 proceeds to step 1530. At step 1530, it may be determined whether use is to be continued based on any suitable criteria such as, for example, input provided by the user via one or more input components 700, control by system 1300 (e.g., similar to criteria described above regarding step 1525), and/or any other suitable criteria. If the operation is to be continued, process 1500 returns to step 1515 (e.g., or to step 1510 if apparatus 10 is to be reconfigured). As many iterations as desired of steps 1510 through 1530 may be performed. If use is not to be continued, process 1500 ends at step 1535.

The invention includes other illustrative embodiments ("Embodiments") as follows.

Embodiment 1: A device for sexual stimulation, comprising: a main body configured to be at least partially inserted into a vagina of a female user, the main body including: a first end portion and a second end portion, a first rod portion extending from the first end portion, and a second rod portion coupled to the first rod portion, wherein the second rod portion extends to the second end portion, and wherein the second rod portion has a first curved surface and a second curved surface facing away from the first curved surface; a first stimulation portion disposed at the first curved surface and adjacent to the second end portion, wherein at least a portion of the first stimulation portion is a stimulation point; and an actuator assembly configured to actuate the stimulation point to stimulate a G-spot of the vagina or a surrounding area thereof along a first vector; wherein a first axis is defined by an axis of the first rod portion, wherein a second axis is defined by a line perpendicular to the first vector and intersecting with the first axis, wherein a first threshold angle is defined by an angle between the first axis and the second axis, and wherein the first stimulation portion continuously contacts an upper wall of the vagina based on the first threshold angle.

Embodiment 2: The device of Embodiment 1, wherein the first threshold angle is between $2\pi/3$ rad and $5\pi/6$ rad.

Embodiment 3: The device of Embodiment 1, wherein the first threshold angle is an obtuse angle.

Embodiment 4: The device of Embodiment 1, wherein the first curved surface includes: a first global extreme point, and a first tangent plane including the first global extreme point, wherein a second threshold angle is defined by an angle between the first tangent plane and the first vector, and wherein the second threshold angle is between $\pi/4$ rad and $\pi/3$ rad.

Embodiment 5: The device of Embodiment 1, wherein the first vector that is applied to the G-spot is decomposed into a first vector component and a second vector component, and wherein the first vector component is perpendicular to the vaginal wall where the G-spot is located and configured to provide a pressing stimulation to the G-spot, and wherein the second vector component is substantially parallel to the vaginal wall where the G-spot is located and configured to provide a rubbing stimulation to the G-spot.

Embodiment 6: The device of Embodiment 4, wherein the second curved surface includes: a second global extreme point, and a second tangent plane including the second global extreme point, wherein a third threshold angle is defined by an angle between the second tangent plane and the first vector, and the third threshold angle is greater than the second threshold angle, and wherein the third threshold angle is between $\pi/4$ rad and $\pi/2$ rad.

Embodiment 7: The device of Embodiment 1, further comprising a heating sheet disposed at the curve rod portion.

Embodiment 8: The device of Embodiment 1, wherein: the actuator assembly includes a rotating motor and a crank linkage mechanism driven by the rotating motor, and the crank linkage mechanism has a flexible rod configured to push the stimulation point along the first vector.

Embodiment 9: The device of Embodiment 1, further comprising an arm including: an elastic connecting portion, and a second stimulation portion configured to connect to the main body via the elastic connecting portion, wherein the elastic connecting portion deforms elastically as the main body is inserted into the vagina of the female user, causing the second stimulation portion to exert pressure along a second vector on a clitoris or surrounding area thereof of the female user, and wherein the second vector crosses or overlaps with the first vector.

Embodiment 10: The device of Embodiment 9, further comprising a vibrating motor disposed within the second stimulation portion.

Embodiment 11: The device of Embodiment 1, further comprising a handle including: a fixed end portion configured to connect to the first end portion, a free end portion, and a handhold portion extending from the fixed end portion to the free end portion, wherein a third vector is defined by one direction of a reciprocating motion of the entire device, and wherein a fourth threshold angle is defined by an angle between the third vector and the first vector, wherein the fourth threshold angle is between π/3 rad and π/2 rad, and wherein a fifth threshold angle is defined by an angle between the third vector and the first axis, wherein the fifth threshold angle is between π/9 rad and π/4 rad, and wherein the first threshold angle satisfies the equation: first threshold angle −π/2=fourth threshold angle−fifth threshold angle.

Embodiment 12: A device for sexual stimulation, comprising: a main body configured to be at least partially inserted into a vagina of a female user, the main body including: a first end portion, a second end portion, a first curved surface, and a second curved surface facing away from the first curved surface, wherein both the first curved surface and the second curved surface extend from the first end portion to the second end portion, a first stimulation portion disposed at the first curved surface and adjacent to the second end portion, wherein at least a portion of the first stimulation portion is a stimulation point, an actuator assembly configured to actuate the stimulation point to stimulate a G-spot of the vagina or a surrounding area thereof along a first vector; and an arm including: an elastic connecting portion, and a second stimulation portion configured to connect to the main body via the elastic connecting portion, wherein the elastic connecting portion deforms elastically as the main body is inserted into the vagina of the female user, causing the second stimulation portion to exert pressure along a second vector on a clitoris or surrounding area thereof of the female user, and wherein the second vector crosses or overlaps with the first vector.

Embodiment 13: The device of Embodiment 12, wherein the connecting portion is shell-less.

Embodiment 14: The device of Embodiment 13, further comprising a vibrating motor disposed within the second stimulation portion.

Embodiment 15: The device of Embodiment 14, wherein the connecting portion has an internal cavity tube configured to house wires for powering the vibrating motor.

Embodiment 16: A device for sexual stimulation, comprising: a main body configured to be at least partially inserted into a vagina of a female user, the main body including: a first end portion and a second end portion, a first rod portion extending from the first end portion, and a second rod portion coupled to the first rod portion, wherein the second rod portion extends to the second end portion, and wherein the second rod portion has a first curved surface and a second curved surface facing away from the first curved surface; a first stimulation portion having a stimulation area disposed on the first curved surface and adjacent to the second end portion, a handle including: a fixed end portion configured to connect to the first end potion, a free end portion, a handhold portion extending from the fixed end portion to the free end portion, and an actuator assembly configured to actuate the stimulation area to apply pulsatile stimulation to a G-spot of the vagina or a surrounding area thereof along a first vector, and wherein the handhold portion is configured to provide at least one grip manner for the female user, wherein a third vector is defined by a direction of an insert motion of the main body into the vagina, and wherein a sixth angle is defined by the first vector and the third vector and is slightly greater than π/2 rad.

Embodiment 17: The device of Embodiment 16, wherein the sixth angle differs from π/2 rad by a value, wherein the value is between 0 rad and π/18.

Embodiment 18: The device of Embodiment 16, wherein a first axis is defined by an axis of the first rod portion, a second axis is defined by a line perpendicular to the first vector, a first threshold angle is defined by an angle between the first axis and the second axis, a fourth threshold angle is defined by an angle between a fourth vector substantially opposed to the third vector and the first vector, the fourth threshold angle is between π/3 rad and π/2 rad, a fifth threshold angle is defined by an angle between the third vector and the first axis, the fifth threshold angle is between π/9 rad and π/4 rad, and the first threshold angle satisfies the equation: first threshold angle −π/2=fourth threshold angle−fifth threshold angle.

Embodiment 19: The device of Embodiment 16, further comprising an arm, wherein the arm includes: an elastic connecting portion, and a second stimulation portion configured to connect to the main body via the elastic connecting portion, wherein the main body includes a housing and a flexible covering member encasing the housing, a stimulation point of the stimulation area being disposed on the flexible covering member, and wherein the housing includes: a first opening facing the first stimulation portion, and a second opening disposed near the first opening.

Embodiment 20: The device of Embodiment 19, further comprising a covering plate configured to be attached to the housing for covering the second opening.

Embodiment 21: The device of Embodiment 16, further comprising an embedded connector, wherein: the actuator assembly has a pushing rod including a power output end portion aligned with a stimulation point of the stimulation area, and the embedded connector is configured to connect the power output end portion to the stimulation point.

The exemplary disclosed system, apparatus, and method may provide an effective technique for providing effective stimulation to the clitoris and/or G-spot of female genitalia. For example, the exemplary disclosed system, apparatus, and method may provide an effective technique for simultaneously providing effective stimulation to both the clitoris and G-spot. The exemplary disclosed system, apparatus, and method may provide an adult toy that continuously achieves effective contact with the upper wall of the vagina when the adult toy is inserted into the vagina. Further for example, the exemplary disclosed system, apparatus, and method may provide an adult toy that applies pressure in suitable directions relative to the clitoris and the G-spot to provide effective stimulation.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system, apparatus, and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A device for sexual stimulation, comprising:

a main body configured to be at least partially inserted into a vagina of a female user, the main body including:
  a first end portion and a second end portion,
  a first rod portion extending from the first end portion, and
  a second rod portion coupled to the first rod portion,
  wherein the second rod portion extends to the second end portion, and
  wherein the second rod portion has a first curved surface and a second curved surface facing away from the first curved surface;

a first stimulation portion disposed at the first curved surface and adjacent to the second end portion, wherein at least a portion of the first stimulation portion is a stimulation point;

an actuator assembly configured to actuate the stimulation point to stimulate a G-spot of the vagina or a surrounding area thereof along a first vector;

an arm including an elastic connecting portion; and a second stimulation portion configured to connect to the main body via the elastic connecting portion, wherein the main body includes a housing and a flexible covering member encasing the housing, a stimulation point of the stimulation area being disposed on the flexible covering member;

wherein the housing includes
  a first opening facing the first stimulation portion, and
  a second opening disposed near the first opening;

wherein a first axis is defined by an axis of the first rod portion, wherein a second axis is defined by a line perpendicular to the first vector and intersecting with the first axis, wherein a first threshold angle is defined by an angle between the first axis and the second axis, wherein the first stimulation portion is configured to continuously contact an upper wall of the vagina based on the first threshold angle.

2. The device of claim 1, wherein the first threshold angle is between 2π/3 rad and 5π/6 rad.

3. The device of claim 1, wherein the first threshold angle is an obtuse angle.

4. The device of claim 1, wherein the first curved surface includes:

a first global extreme point, and a first tangent plane including the first global extreme point, wherein a second threshold angle is defined by an angle between the first tangent plane and the first vector, and wherein the second threshold angle is between π/4 rad and π/3 rad.

5. The device of claim 4, wherein the second curved surface includes:

a second global extreme point, and a second tangent plane including the second global extreme point, wherein a third threshold angle is defined by an angle between the second tangent plane and the first vector, and the third threshold angle is greater than the second threshold angle, and wherein the third threshold angle is between π/4 rad and π/2 rad.

6. The device of claim 1, wherein the first vector that is applied to the G-spot is decomposed into a first vector component and a second vector component, and wherein the first vector component is perpendicular to the vaginal wall where the G-spot is located and configured to provide a pressing stimulation to the G-spot, and wherein the second vector component is substantially parallel to the vaginal wall where the G-spot is located and configured to provide a rubbing stimulation to the G-spot.

7. The device of claim 1, further comprising a heating sheet disposed at the second rod portion.

8. The device of claim 1, wherein:

the actuator assembly includes a rotating motor and a crank linkage mechanism driven by the rotating motor, and the crank linkage mechanism has a flexible rod configured to push the stimulation point along the first vector.

9. The device of claim 1, wherein the elastic connecting portion deforms elastically as the main body is inserted into the vagina of the female user, causing the second stimulation portion to exert pressure along a second vector on a clitoris or surrounding area thereof of the female user, and wherein the second vector crosses or overlaps with the first vector.

10. The device of claim 9, further comprising a vibrating motor disposed within the second stimulation portion.

11. The device of claim 1, further comprising a handle including:

a fixed end portion configured to connect to the first end portion, a free end portion, and a handhold portion extending from the fixed end portion to the free end portion, wherein a third vector is defined by one direction of a reciprocating motion of the entire device, and wherein a fourth threshold angle is defined by an angle between the third vector and the first vector, wherein the fourth threshold angle is between π/3 rad and π/2 rad, and wherein a fifth threshold angle is defined by an angle between the third vector and the first axis, wherein the fifth threshold angle is between π/9 rad and π/4 rad, and wherein the first threshold angle satisfies the equation:

$$\text{first threshold angle} - \pi/2 = \text{fourth threshold angle} - \text{fifth threshold angle}.$$

12. A device for sexual stimulation, comprising:

a main body configured to be at least partially inserted into a vagina of a female user, the main body including:
  a first end portion,
  a second end portion,
  a first curved surface, and
  a second curved surface facing away from the first curved surface, wherein both the first curved surface and the second curved surface extend from the first end portion to the second end portion, a first stimulation portion disposed at the first curved surface and adjacent to the second end portion, wherein at least a portion of the first stimulation portion is a stimulation point, an actuator assembly configured to actuate the stimulation point to stimulate a G-spot of the vagina or a surrounding area thereof along a first vector; and an arm including:
  an elastic connecting portion, and
  a second stimulation portion configured to connect to the main body via the elastic connecting portion, wherein the elastic connecting portion deforms elastically as the main body is inserted into the vagina of the female user, causing the second stimulation portion to exert pressure along a second vector on a clitoris or surrounding area thereof of the female user, wherein the second vector crosses or overlaps with the first vector, wherein the main body includes a housing and a flexible covering member encasing the housing, a stimulation point of the stimulation area being disposed on the flexible covering member; and wherein the housing includes a first opening facing the first stimulation portion, and a second opening disposed near the first opening.

13. The device of claim 12, wherein the connecting portion is shell-less.

14. The device of claim 13, further comprising a vibrating motor disposed within the second stimulation portion.

15. The device of claim 14, wherein the connecting portion has an internal cavity tube configured to house wires for powering the vibrating motor.

16. A device for sexual stimulation, comprising:

a main body configured to be at least partially inserted into a vagina of a female user, the main body including:

a first end portion and a second end portion, a first rod portion extending from the first end portion, and a second rod portion coupled to the first rod portion, wherein the second rod portion extends to the second end portion, and wherein the second rod portion has a first curved surface and a second curved surface facing away from the first curved surface;

a first stimulation portion having a stimulation area disposed on the first curved surface and adjacent to the second end portion, a handle including:

a fixed end portion configured to connect to the first end potion, a free end portion, and a handhold portion extending from the fixed end portion to the free end portion, an arm including:

an elastic connecting portion, and a second stimulation portion configured to connect to the main body via the elastic connecting portion, wherein the main body includes a housing and a flexible covering member encasing the housing, a stimulation point of the stimulation area being disposed on the flexible covering member, and wherein the housing includes:

a first opening facing the first stimulation portion, and a second opening disposed near the first opening;

an actuator assembly configured to actuate the stimulation area to apply pulsatile stimulation to a G-spot of the vagina or a surrounding area thereof along a first vector, wherein the handhold portion is configured to provide at least one grip manner for the female user to engage an insert motion, wherein a third vector is defined by a direction of the insert motion of the main body into the vagina, wherein a sixth angle is defined by the first vector and the third vector and is slightly greater than $\pi/2$ rad, wherein the first rod portion is configured to be inserted in the vagina of the female user, and wherein the second rod portion is configured to be entirely inserted in the vagina of the female user.

17. The device of claim 16, wherein the sixth angle differs from $\pi/2$ rad by a value, wherein the value is between 0 rad and $\pi/18$.

18. The device of claim 16, wherein:

a first axis is defined by an axis of the first rod portion, a second axis is defined by a line perpendicular to the first vector, a first threshold angle is defined by an angle between the first axis and the second axis, a fourth threshold angle is defined by an angle between a fourth vector substantially opposed to the third vector and the first vector, the fourth threshold angle is between $\pi/3$ rad and $\pi/2$ rad, a fifth threshold angle is defined by an angle between the third vector and the first axis, the fifth threshold angle is between $\pi/9$ rad and $\pi/4$ rad, and the first threshold angle satisfies the equation:

$$\text{first threshold angle} - \pi/2 = \text{fourth threshold angle} - \text{fifth threshold angle}.$$

19. The device of claim 16, further comprising a covering plate configured to be attached to the housing for covering the second opening.

20. The device of claim 16, further comprising an embedded connector, wherein:

the actuator assembly has a pushing rod including a power output end portion aligned with a stimulation point of the stimulation area, and the embedded connector is configured to connect the power output end portion to the stimulation point.

* * * * *